(12) United States Patent
Fujii et al.

(10) Patent No.: US 11,318,880 B2
(45) Date of Patent: May 3, 2022

(54) VEHICLE ILLUMINATION SYSTEM, VEHICLE SYSTEM, LAMP UNIT AND VEHICLE LAMP

(71) Applicant: KOITO MANUFACTURING CO., LTD., Tokyo (JP)

(72) Inventors: Keisuke Fujii, Shizuoka (JP); Hiroyuki Harada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 55 days.

(21) Appl. No.: 16/642,743

(22) PCT Filed: Aug. 6, 2018

(86) PCT No.: PCT/JP2018/029448
§ 371 (c)(1),
(2) Date: Feb. 27, 2020

(87) PCT Pub. No.: WO2019/044404
PCT Pub. Date: Mar. 7, 2019

(65) Prior Publication Data
US 2021/0078484 A1    Mar. 18, 2021

(30) Foreign Application Priority Data

Sep. 1, 2017   (JP) ............................. JP2017-168285
Sep. 1, 2017   (JP) ............................. JP2017-168286
Oct. 23, 2017  (JP) ............................. JP2017-204725

(51) Int. Cl.
*B60Q 1/50*     (2006.01)
*F21S 41/663*   (2018.01)
(Continued)

(52) U.S. Cl.
CPC ............. *B60Q 1/50* (2013.01); *B60Q 1/0041* (2013.01); *B60Q 1/085* (2013.01); *B60Q 1/122* (2013.01);
(Continued)

(58) Field of Classification Search
None
See application file for complete search history.

(56) References Cited

U.S. PATENT DOCUMENTS 10,676,023 B2 *  6/2020  Tatara .................. B60Q 1/0408
2010/0265057 A1  10/2010 Yeh
(Continued)

FOREIGN PATENT DOCUMENTS

EP   1 645 466 A1   4/2006
JP   5-20905 A      1/1993
(Continued)

OTHER PUBLICATIONS

International Search Report (PCT/ISA/210) dated Oct. 23, 2018 issued by the International Searching Authority in International Application No. PCT/JP2018/029448.
(Continued)

*Primary Examiner* — Ashok Patel
(74) *Attorney, Agent, or Firm* — Sughrue Mion, PLLC

(57) ABSTRACT

A vehicle illumination system provided in a vehicle capable of traveling around a corner by inclining a vehicle body toward a turning direction includes: a headlamp mounted on a front portion of the vehicle; a communication lamp disposed on the vehicle body in a region adjacent to the head lamp so as to be visible from ahead of the vehicle; and an illumination control unit configured to change a lighting mode of the communication lamp depending on a state of the vehicle.

7 Claims, 25 Drawing Sheets

(51) Int. Cl.
- *B62J 6/023* (2020.01)
- *B60Q 1/00* (2006.01)
- *B60Q 1/08* (2006.01)
- *B60Q 1/12* (2006.01)
- *B60Q 1/18* (2006.01)
- *F21W 107/17* (2018.01)
- *B62J 45/415* (2020.01)
- *F21V 23/04* (2006.01)
- *H05B 47/10* (2020.01)
- *H05B 47/115* (2020.01)
- *F21Y 115/10* (2016.01)

(52) U.S. Cl.
CPC ............... *B60Q 1/18* (2013.01); *B62J 6/023* (2020.02); *B62J 45/4151* (2020.02); *F21S 41/663* (2018.01); *F21V 23/0471* (2013.01); *F21V 23/0492* (2013.01); *H05B 47/10* (2020.01); *H05B 47/115* (2020.01); *B60Q 2400/50* (2013.01); *F21W 2107/17* (2018.01); *F21Y 2115/10* (2016.08)

(56) References Cited

U.S. PATENT DOCUMENTS

| | | |
|---|---|---|
| 2011/0317441 A1 | 12/2011 | Yasuhara et al. |
| 2013/0241413 A1 | 9/2013 | Ooba et al. |
| 2017/0101147 A1 | 4/2017 | Hasegawa |

FOREIGN PATENT DOCUMENTS

| | | |
|---|---|---|
| JP | 2006-131212 A | 5/2006 |
| JP | 2008-155767 A | 7/2008 |
| JP | 2010-30470 A | 2/2010 |
| JP | 3161286 U | 7/2010 |
| JP | 2012-6533 A | 1/2012 |
| JP | 2013-224126 A | 10/2013 |
| JP | 2017-37806 A | 2/2017 |
| JP | 2017-74820 A | 4/2017 |
| JP | 2017-100500 A | 6/2017 |

OTHER PUBLICATIONS

Written Opinion (PCT/ISA/237) dated Oct. 23, 2018 issued by the International Searching Authority in International Application No. PCT/JP2018/029448.

\* cited by examiner

VEHICLE ILLUMINATION SYSTEM, VEHICLE SYSTEM, LAMP UNIT AND VEHICLE LAMP

TECHNICAL FIELD

The present invention relates to a vehicle illumination system.

The present invention also relates to a vehicle system and a lamp unit including a road surface drawing lamp.

The present invention also relates to a vehicle lamp.

BACKGROUND ART

A headlamp for a motorcycle is known in Patent Literature 1 and the like.

In addition, a road surface drawing lamp unit that draws a drawing pattern such as a figure or a character on a road surface is known in Patent Literature 2 and the like.

Further, a tail lamp for a motorcycle including a tail lamp and the like is known in Patent Literature 3 and the like.

CITATION LIST

Patent Literature

Patent Literature 1: JP-A-2017-100500
Patent Literature 2: JP-A-2017-37806
Patent Literature 3: JP-A-H5-20905

SUMMARY OF INVENTION

Technical Problem

A size of the headlamp (particularly a light source) mounted on an automobile such as a motorcycle in Patent Literature 1 tends to be reduced in accordance with technological progress and a request of a user. Therefore, visibility of the motorcycle from another vehicle (such as a preceding vehicle or an oncoming vehicle) or a pedestrian when the headlamp is lit may be lowered.

In order to transmit appropriate information to a driver of the vehicle, an oncoming vehicle, a pedestrian or the like, a drawing pattern on a road surface is required to be adjusted depending on a state of the own vehicle.

For example, in order to appropriately ensure an inter-vehicle distance between the own vehicle such as the motorcycle and a following vehicle, surroundings of the own vehicle are required to be appropriately notified of information on the own vehicle.

An object of the present invention is to provide a vehicle illumination system capable of improving visibility of a vehicle.

Another objet of the present invention is to provide a vehicle system and a lamp unit capable of appropriately adjusting a drawing pattern on a road surface depending on a state of a vehicle.

Another object of the present invention is to provide a vehicle lamp capable of forming a road surface drawing pattern for appropriately notifying an object around an own vehicle of information on the own vehicle.

Solution to Problem

In order to achieve the above object, a vehicle illumination system of the present invention is a vehicle illumination system provided in a vehicle capable of traveling around a corner by inclining a vehicle body toward a turning direction. The vehicle illumination system includes:

a headlamp mounted on a front portion of the vehicle;

a communication lamp disposed on the vehicle body in a region adjacent to the head lamp so as to be visible from ahead of the vehicle; and an illumination control unit configured to change a lighting mode of the communication lamp depending on a state of the vehicle.

According to the vehicle illumination system, visibility of the vehicle on which the vehicle illumination system is mounted can be improved. Thereby, for example, safety during nighttime traveling (when the head lamp is lit) can be improved.

The illumination control unit may be configured to change the lighting mode of the communication lamp depending on a lighting mode of the headlamp.

According to this configuration, the visibility of the vehicle when the headlamp is lit can be further improved.

The communication lamp includes a plurality of light emitting segments.

The illumination control unit may be configured to change a lighting mode of each of the plurality of light emitting segments.

According to this configuration, the visibility of the vehicle can be further improved by changing light emission patterns of the plurality of light emitting segments in various manners.

Each of the plurality of light emitting segments includes a light source and a cover member configured to cover the light source and to transmit light from the light source.

The cover member may be configured to be visible in a color that is the same as or similar to a color of the region in which the communication lamp of the vehicle body is disposed when the light source is not lit.

According to this configuration, the visibility of the vehicle when the communication lamp is lit can be improved without impairing a design of the vehicle (particularly the vehicle body on which the communication lamp is mounted) when the communication lamp is not lit.

A road surface drawing lamp capable of forming a road surface drawing pattern on a road surface is further provided.

A tight emission pattern of the communication lamp may be associated with the road surface drawing pattern.

A light emission timing of the light emission pattern may coincide with a light emission timing of the road surface drawing pattern.

According to these configurations, the visibility of the vehicle can be further improved by forming the road surface drawing pattern in accordance with light emission of the communication lamp.

In order to achieve the above object, a vehicle system of the present invention includes:

a road surface drawing lamp mounted on a vehicle capable of traveling around a corner by inclining a vehicle body toward a turning direction; and a control unit configured to adjust a shape of a road surface drawing pattern formed on a road surface by the road surface drawing lamp.

The control unit is configured to maintain the shape of the road surface drawing pattern regardless of an inclination stale of the vehicle body.

According to this configuration, the road surface drawing pattern can be adjusted depending on a state of the own vehicle. In particular, by maintaining the shape of the road surface drawing pattern regardless of the inclination slate of the vehicle body, appropriate information can be always provided to a driver of the vehicle, an oncoming vehicle, a pedestrian or the like.

In addition, a vehicle system of the present invention includes:

a road surface drawing lamp mounted on a vehicle capable of traveling around a corner by inclining a vehicle body toward a turning direction; and a control unit configured to adjust a shape of a road surface drawing pattern formed on a road surface by the road surface drawing lamp.

The control unit is configured to change the shape of the road surface drawing pattern depending on an inclination state of the vehicle body.

According to this configuration, the road surface drawing pattern can be adjusted depending on a state of the own vehicle. In particular, by changing the shape of the road surface drawing pattern depending on the inclination state of the vehicle body, information necessary for safely traveling around the corner and the like can be provided to a driver of the vehicle.

In the vehicle system of the present invention, a first sensor configured to detect the inclination state of the vehicle body may be provided in the road surface drawing lamp.

According to this configuration, detection information on the inclination state can be appropriately reflected in formation of the road surface drawing pattern.

In the vehicle system of the present invention, a second sensor configured to detect environmental information around the vehicle may be provided in the road surface drawing lamp.

According to this configuration, the environment information around the vehicle can be appropriately reflected in the formation of the road surface drawing pattern.

In the vehicle system of the present invention, the environmental information includes an obstacle around the vehicle.

When the obstacle is detected by the second sensor, the control unit is configured to control the road surface drawing lamp to form an additional drawing pattern added to the road surface drawing pattern, based on at least one of position information of the vehicle, position information of the obstacle and information on a relative positional relationship with respect to the obstacle.

According to this configuration, obstacle detection information and position information of the vehicle and the obstacle can be appropriately reflected in the formation of the road surface drawing pattern.

In order to achieve the above object, a lamp unit of the present invention is a lamp unit provided in a vehicle capable of traveling around a corner by inclining a vehicle body toward a turning direction. The lamp unit includes:

a road surface drawing lamp; and a control unit configured to adjust a shape of a road surface drawing pattern formed on a road surface by the road surface drawing lamp.

The control unit configured to operate the road surface drawing lamp by at least one of a first mode in which the shape of the road surface drawing pattern is maintained regardless of an inclination state of the vehicle body, and a second mode in which the shape of the road surface drawing pattern is changed depending on the inclination state of the vehicle body.

According to this configuration, the lamp unit capable of adjusting the road surface drawing pattern depending on a state of the vehicle can be provided.

In order to achieve the above object, a vehicle lamp of the present invention is a vehicle lamp provided in a vehicle capable of traveling around a corner by inclining a vehicle body toward a turning direction. The vehicle lamp includes:

a road surface drawing lamp configured to form a road surface drawing pattern on a road surface around the vehicle;

a detection unit configured to detect an object around the vehicle; and an illumination control unit configured to control the road surface drawing lamp.

The illumination control unit is configured to control the road surface drawing lamp so as to form the road surface drawing pattern based on first detection information of the object acquired from the detection unit.

According to the vehicle lamp of the present disclosure, by forming the road surface drawing pattern on the road surface behind the vehicle under a certain condition, the object behind the vehicle (for example, the following vehicle) can be appropriately notified of information on the own vehicle.

The road surface drawing lamp may be configured to form the road surface drawing pattern on a road surface behind the vehicle.

According to this configuration, for example, the driver of the following vehicle can be appropriately notified of the information on the own vehicle.

The object includes a following vehicle behind the vehicle.

The first detection information may include a case where an inter-vehicle distance between the vehicle and the following vehicle is equal to or smaller than a certain distance.

According to this configuration, when the following vehicle at approaches the own vehicle, the driver of the following vehicle can be alerted to appropriately ensure the inter-vehicle distance to the own vehicle.

The road surface drawing pattern may include information on the inter-vehicle distance.

According to this configuration, the driver of the following vehicle can easily recognize that the road surface drawing pattern is intended to ensure the inter-vehicle distance.

The illumination control unit may be configured to change a display mode of the road surface drawing pattern depending on the inter-vehicle distance.

According to this configuration, the driver of the following vehicle can be more effectively alerted using the road surface drawing pattern.

The illumination control unit may be configured to acquire second detection information different from the first detection information.

According to this configuration, for example, since the road surface drawing pattern can be formed by adding other conditions other than the inter vehicle distance to the following vehicle, the driver of the following vehicle can be more effectively alerted.

The second detection information may include at least one of information on a vehicle speed of the vehicle, information on a change state of the vehicle speed and information on weather.

According to this configuration, in a case where it is important to ensure the inter-vehicle distance, for example, when the own vehicle is traveling at a high speed, when the own vehicle performs a sudden brake, or in bad weather, the road surface drawing pattern can be formed behind the own vehicle.

The illumination control unit may have a first mode in which the road surface drawing pattern is formed depending on the first detection information, and a second mode in which the road surface drawing pattern is formed depending on an input instruction of a driver of the vehicle.

According to this configuration, the road surface drawing pattern can be formed even when it is determined that the driver of the own vehicle is required to alert the following vehicle.

Advantageous Effects of Invention

According to the present invention, a vehicle illumination system capable of improving visibility of aa vehicle can be provided.

In addition, according to the present invention, a vehicle system and a lamp unit capable of adjusting a road surface drawing pattern depending on a state of a vehicle can be provided.

Further, according to the present invention, a vehicle lamp capable of forming a road surface drawing pattern for appropriately notifying an object around an own vehicle of information on the own vehicle can be provided.

DESCRIPTION OF EMBODIMENTS

Embodiments of the present invention will be described with reference to the drawings. In the present embodiment, a "left-right direction", a "front-rear direction" and an "upper-lower direction" are set to be directions relative to a vehicle 100 shown in FIG. 1 for convenience of description. The "front-rear direction" is a direction including a "front direction" and a "rear direction". The "left-right direction" is a direction including a "left direction" and a "right direction". The "upper-lower direction" is a direction including an "upper direction" and a "lower direction".

First Embodiment

Figure 1:
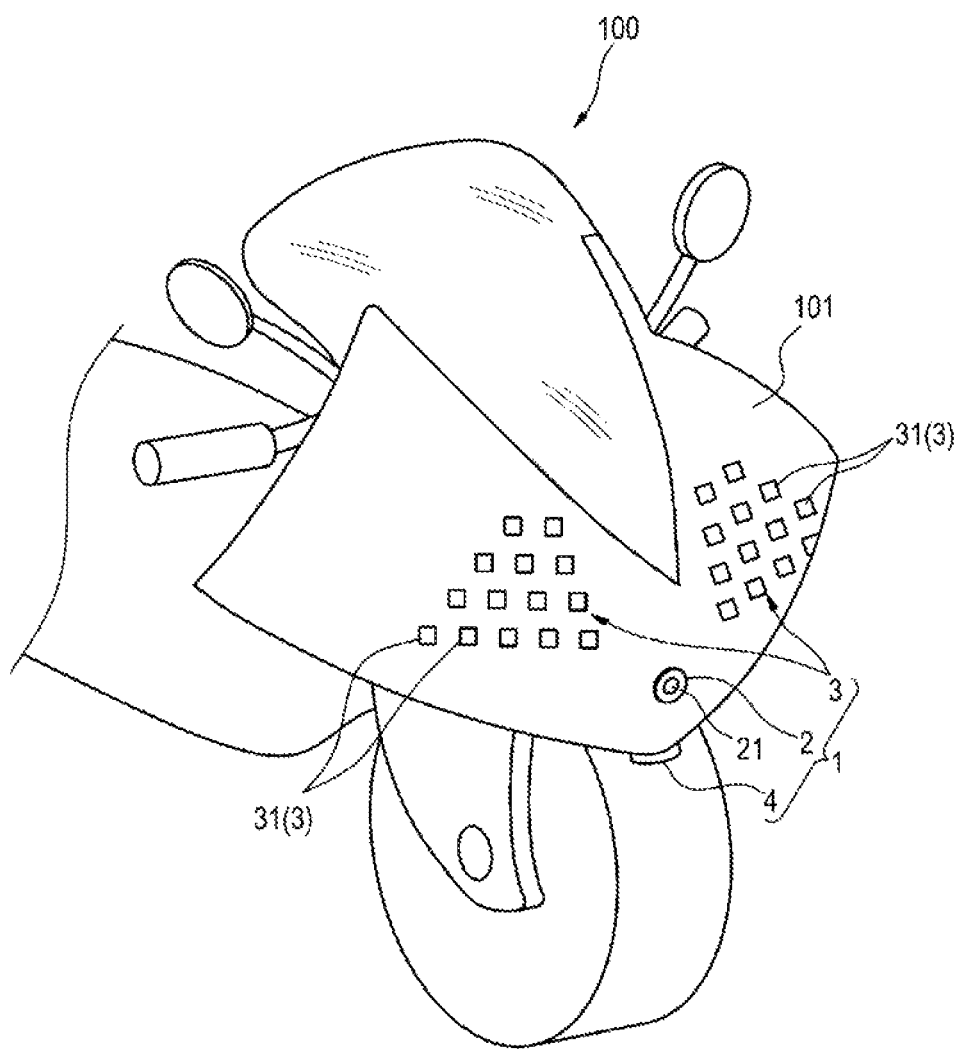
FIG. 1 is a partially enlarged perspective view of a vehicle including a vehicle illumination system according to a first embodiment of the present invention.

FIG. 1 shows a motorcycle as an example of the vehicle 100 including a vehicle illumination system 1 according to a first embodiment. The motorcycle 100 is a vehicle capable of traveling around a corner (a curve) of a road by inclining a vehicle body toward a turning direction. The vehicle of the present embodiment may be any vehicle capable of traveling around a corner by inclining the vehicle body toward a turning direction, such as the motorcycle 100, and the number of wheels is not limited. Therefore, for example, an automatic tricycle or an automobile is included in the vehicle of the present embodiment as long as the vehicle is capable of traveling in the same manner as the motorcycle 100.

Figure 2:
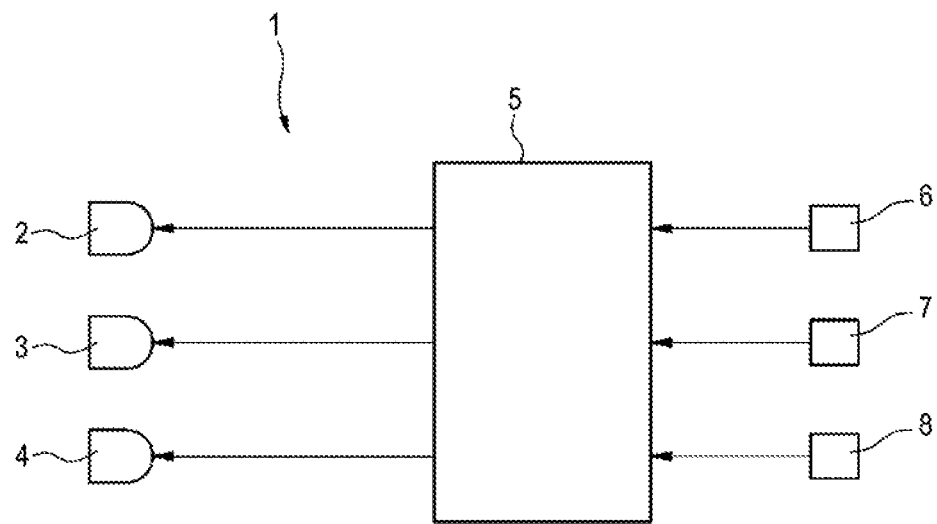
FIG. 2 is a block diagram of the vehicle illumination system in FIG. 1.

As shown in FIGS. 1 and 2, a vehicle illumination system 1 according to the present embodiment is mounted on a front portion of the vehicle body, for example, in a motorcycle 100. The vehicle illumination system 1 includes a headlamp 2 capable of irradiating ahead of the vehicle, a communication lamp 3 visible from ahead of the vehicle, and a road surface drawing lamp 4 capable of forming a drawing pattern on a road surface. Although the motorcycle 100 including one headlamp 2 is illustrated in the present embodiment, the motorcycle 100 may be, for example, a motorcycle including one headlamp on each of left and right sides. The headlamp 2 is disposed at a center of a cowl (an example of the vehicle body) 101 constituting at least part of the vehicle body on a front side of the motorcycle 100. The communication lamp 3 is disposed on the cowl 101 in a region adjacent to the headlamp 2. The communication lamp 3 is not limited to the one disposed on the cowl 101, and may be disposed in a region adjacent to the headlamp 2 and at a position easily visible from around the motorcycle 100. The road surface drawing lamp 4 is preferably disposed at a position that is not easily visible from around the motorcycle 100. In this example, the road surface drawing lamp 4 is disposed below the headlamp 2 and in a lower portion of the cowl 101, for example, as shown in FIG. 1.

The headlamp 2 includes a tight source 21. The light source 21 includes an optical system including at least one of a lens and a reflector, and emits light for illuminating a predetermined region. A lamp light source or a light emitting element may be used in the light source 21. Examples of the lamp light source include an incandescent lamp, a halogen lamp, a discharge lamp, a neon lamp and the like. Examples of the light emitting element include a light emitting diode, a laser diode, an organic EL element and the like.

The communication lamp 3 is a lamp that transmits a state and a traveling direction of the motorcycle 100 to another vehicle or a pedestrian, and also functions as a marker lamp. The communication lamp 3 of the present embodiment is particularly used as a decorative lamp that improves visibility from another vehicle and informs another vehicle of existence of an own vehicle. Therefore, preferably, the communication lamp 3 does not function as a headlight as the headlamp 2, and emits light at a light intensity that does not give glare to a pedestrian or a driver of another vehicle.

The road surface drawing lamp 4 has a configuration for projecting (emitting) a predetermined drawing pattern on a road surface in front of the motorcycle 100. The road surface drawing lamp 4 may be, for example, a projector.

As shown in FIG. 2, the vehicle illumination system 1 includes an illumination control unit 5 that controls operation of the headlamp 2, the communication lamp 3 and the road surface drawing lamp 4. The head lamp 2, the communication lamp 3 and the road surface drawing lamp 4 are connected to the illumination control unit 5. In addition, a bank angle sensor 6 that detects an inclination state (a bank angle) of the motorcycle 100 and an external sensor 7 that detects environmental information outside the vehicle are connected to the illumination control unit 5. Further, a speed sensor 8 or the like that detects a speed of the motorcycle 100 is connected to the illumination control unit 5. The control unit 5, the bank angle sensor 6, the external sensor 7 and the speed sensor 8 may be provided in a lamp chamber of the headlamp 2 (or the road surface drawing lamp 4), or may be mounted at predetermined positions on the vehicle body of the motorcycle 100 outside the headlamp 2 or the like. The control unit 5 may be implemented to function as an integrated control unit (an ECU) mounted on the motorcycle 100, or may be implemented to function as a control device disposed in the lamp chamber of the headlamp 2 or the road surface drawing lamp 4.

The bank angle sensor 6 is a sensor capable of detecting an inclination angle when the vehicle body of the motorcycle 100 is inclined left and right with respect to a vertical line. The bank angle sensor 6 includes, for example, a gyro sensor. The inclination angle of the vehicle body may be calculated based on an image captured by a camera mounted on the motorcycle 100.

The external sensor 7 is a sensor capable of acquiring external information of the own vehicle including surrounding environment of the motorcycle 100 (for example, an obstacle, another vehicle (a preceding vehicle or an oncoming vehicle), a pedestrian, a road shape, a traffic sign and the like). The external sensor 7 includes at least one of, for example, light detection and ranging or laser imaging detection and ranging (a LiDAR), a camera and a radar.

The LiDAR is a sensor that generally emits invisible light forward and acquires information such as a distance to an object, a shape of the object, a material of the object and a color of the object based on the emitted light and the returned light.

The camera is, for example, a camera including an imaging element such as a charge-coupled device (a CCD) and a complementary MOS (a CMOS). The camera includes a camera that detects visible light and an infrared camera that detects infrared rays.

The radar includes a millimeter-wave radar, a microwave radar, a laser radar and the like.

The information detected by the bank angle sensor 6, the external sensor 7 and the speed sensor 8 is transmitted to the illumination control unit 5. The illumination control unit 5 controls the operation of the headlamp 2, the communication lamp 3 and the road surface drawing lamp 4 based on the information transmitted from the sensors 6 to 8. For example, the illumination control unit 5 can control the headlamp 2 based on the information detected by the sensors to adjust a light distribution pattern formed in front of the vehicle. The illumination control unit 5 can control the communication lamp 3 based on the information detected by the sensors 6 to is to adjust a light emission pattern (hereinafter referred to as a communication pattern) visible from ahead of the vehicle. The illumination control unit 5 can control the road surface drawing lamp 4 based on the information detected by the sensors 6 to 8 adjust the road surface drawing pattern formed on the road surface.

Figure 3:
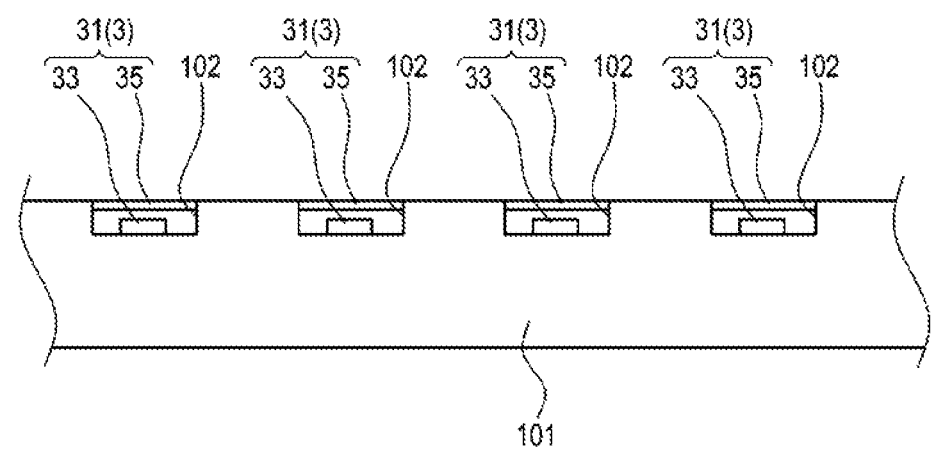
FIG. 3 is a cross-sectional view showing a schematic configuration of a communication lamp of the vehicle illumination system in FIG. 2.

FIG. 3 is a view showing a schematic configuration of the communication lamp 3. As shown in FIG. 3, the communication lamp 3 includes a plurality of light emitting segments 31 disposed at predetermined intervals on a surface of the cowl 101. Each of the plurality of light emitting segments 31 includes a light source 33 and a film 35 (an example of a cover member). Each light source 33 is disposed in each of a plurality of recesses 102 formed in the cowl 101. Examples of the light source 33 include a light emitting diode, a laser diode, an organic EL element and the like.

Each film 35 is attached to each recess 102 so as to cover an upper surface of each light source 33, and transmits light front each light source 33. That is, each light emitting segment 31 is formed by accommodating each light source 33 in a lamp chamber formed by each recess 102 and each film 35. The film 35 is formed of a material that transmits light from the light source 33 and is visible in a color that is the same as or similar to a color of the cowl 101 when the light source 33 is not lit. For example, when the cowl 101 is silver, the film 35 may also be formed of a material that is visible in the same silver color as that of the cowl 101 when the light source 33 is not lit, and is visible in a light emission color (for example, white) of the light source 33 when the light source 33 is lit.

In this example, the plurality of recesses 102 are formed on the surface of the cowl 101, and one light source 33 is accommodated in each recess 102, but the present invention is not limited thereto. For example, a configuration may be used in which a transparent flexible printed circuit board (FPC) including a plurality of light sources arranged at predetermined intervals is mounted on the surface of the cowl 101, a surface of the transparent FPC may be covered with a cover member that transmits light from the light source of the transparent FPC and is visible in a color that is the same as or similar to a color of the cowl 101 when the light source is not lit.

The illumination control unit 5 is configured to change a lighting mode of the communication lamp 3 depending on a state of the motorcycle 100. For example, the illumination control unit 5 may be configured to light at least part of the plurality of segments 31 of the communication lamp 3 simultaneously with a lighting timing of the headlamp 2 or in conjunction with the lighting timing of the headlamp 2. The illumination control unit 5 may be configured to light at least part of the plurality of segments 31 of the communication lamp 3 when the external sensor 7 determines that an object such as another vehicle or a pedestrian exists within a certain distance from the motorcycle 100. The illumination control unit 5 may be configured to light at least a part of the plurality of segments 31 of the communication lamp 3 when a speed detected by the speed sensor 8 exceeds a certain threshold or when the speed is lower than the certain threshold.

As described above, the vehicle illumination system 1 provided in the motorcycle 100 includes the headlamp 2 mounted on a front portion of the vehicle, a communication lamp 3 disposed on the cowl 101 in the region adjacent to the headlamp 2 so as to be visible from ahead of the vehicle, and a state of the vehicle, and the illumination control unit 5 configured to change the lighting mode of the communication lamp 3 depending on the state of the vehicle. According to this configuration, for example, when the headlamp 2 of the motorcycle 100 is lit, the communication lamp 3 is lit depending on the state of the vehicle, so that visibility of the vehicle can be improved. Thereby, even when a size of the headlamp 2 is reduced, the visibility of the motorcycle 100 is not impaired, and safety during nighttime traveling can be improved.

The illumination control unit 5 may be configured to change the lighting mode of the communication lamp 3 depending on as lighting anode of the headlamp 2. Therefore, the visibility of the motorcycle 100 when the headlamp 2 is lit can be improved.

The communication lamp 3 includes the plurality of light emitting segments 31, and the illumination control unit 5 can be configured to change a lighting mode of each of the plurality of light emitting segments 31. According to this configuration, the visibility of the motorcycle 100 can be further improved by changing light emission patterns of the plurality of light emitting segments 31 in various manners.

The film 35 of each of the plurality of light emitting segments 31 are configured to be visible in, the color that is the same as or similar to the color of the region of the cowl 101 of the motorcycle 100 in which the communication lamp 3 is disposed when the light source 33 is not lit. According to this configuration, a design of the motorcycle 100 when the communication lamp 3 is not lit is not impaired.

Figure 4:
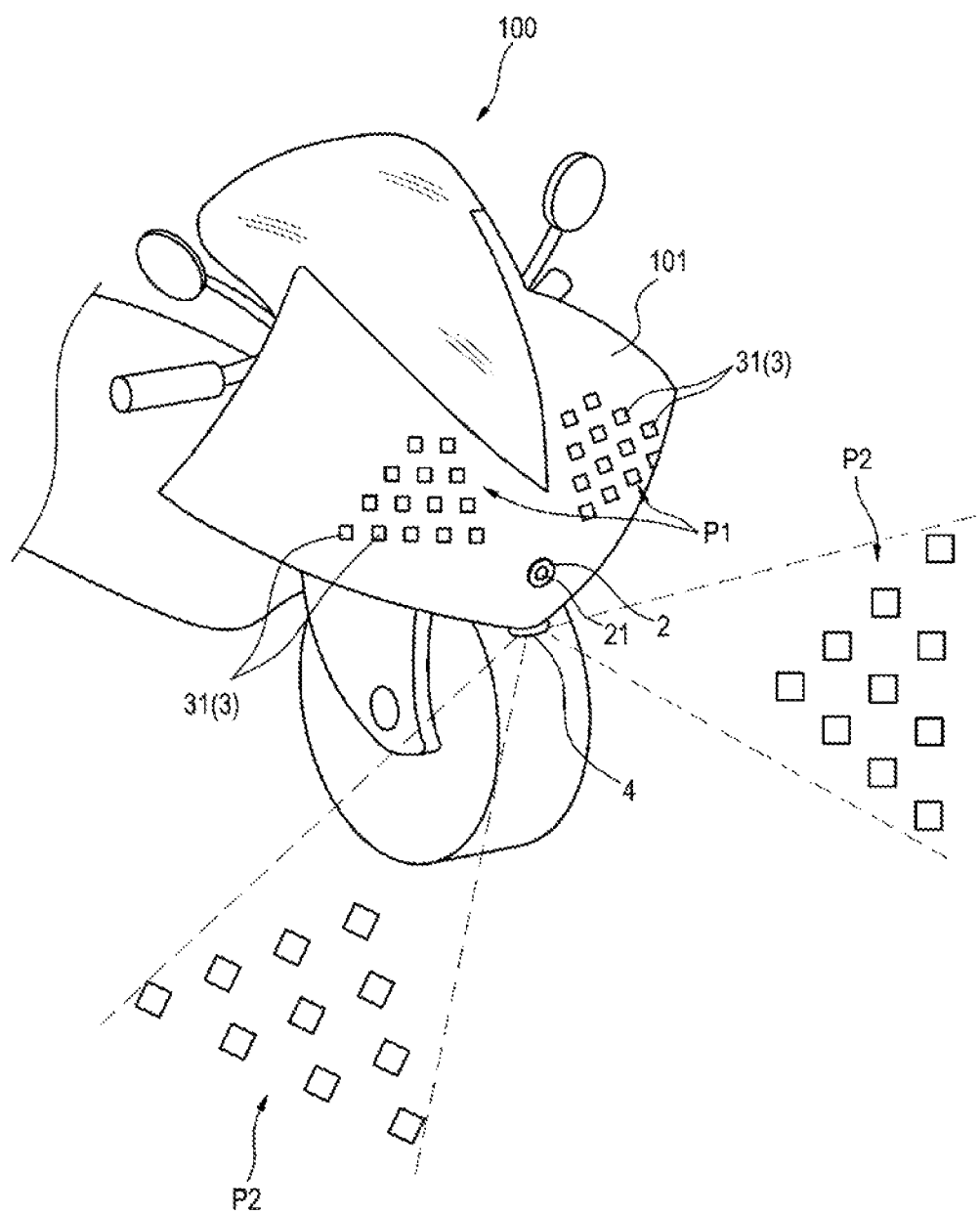
FIG. 4 is a view showing an example of an illumination pattern of the vehicle illumination system.

Next, an example of an illumination pattern of the vehicle illumination system 1 according to the present embodiment will be described with reference to FIGS. 4 to 7. FIG. 4 is a view showing an example of the light emission pattern of the communication lamp 3 and the road surface drawing pattern formed on the road surface by the road surface drawing lamp 4.

As shown in FIG. 4, the illumination control unit 5 may be configured to form a road surface drawing pattern P2 having a predetermined shape on the road surface by the road surface drawing lamp 4 in conjunction with light emission of the communication lamp 3. For example, the road surface drawing pattern P2 preferably has a shape corresponding to a light emission pattern P1 of the communication lamp 3 (that is, an arrangement shape of the plurality of light emitting segments 31). Since the road surface drawing pattern P2 is formed on the road surface in conjunction with the light emission of the communication lamp 3, the visibility of the motorcycle 100 from a preceding vehicle, an oncoming vehicle or the pedestrian can be further improved.

The illumination control unit 5 can change a light emission timing of the light emission pattern P1 of the communication lamp 3 and a light emission timing of the road surface drawing pattern P2 formed by the road surface drawing lamp 4 in various manners depending on live state of the motorcycle 100 and a change in the external environment. For example, the light emission timing of the light emission pattern P1 may coincide with the light emission timing of live road surface drawing pattern P2.

Figure 5:
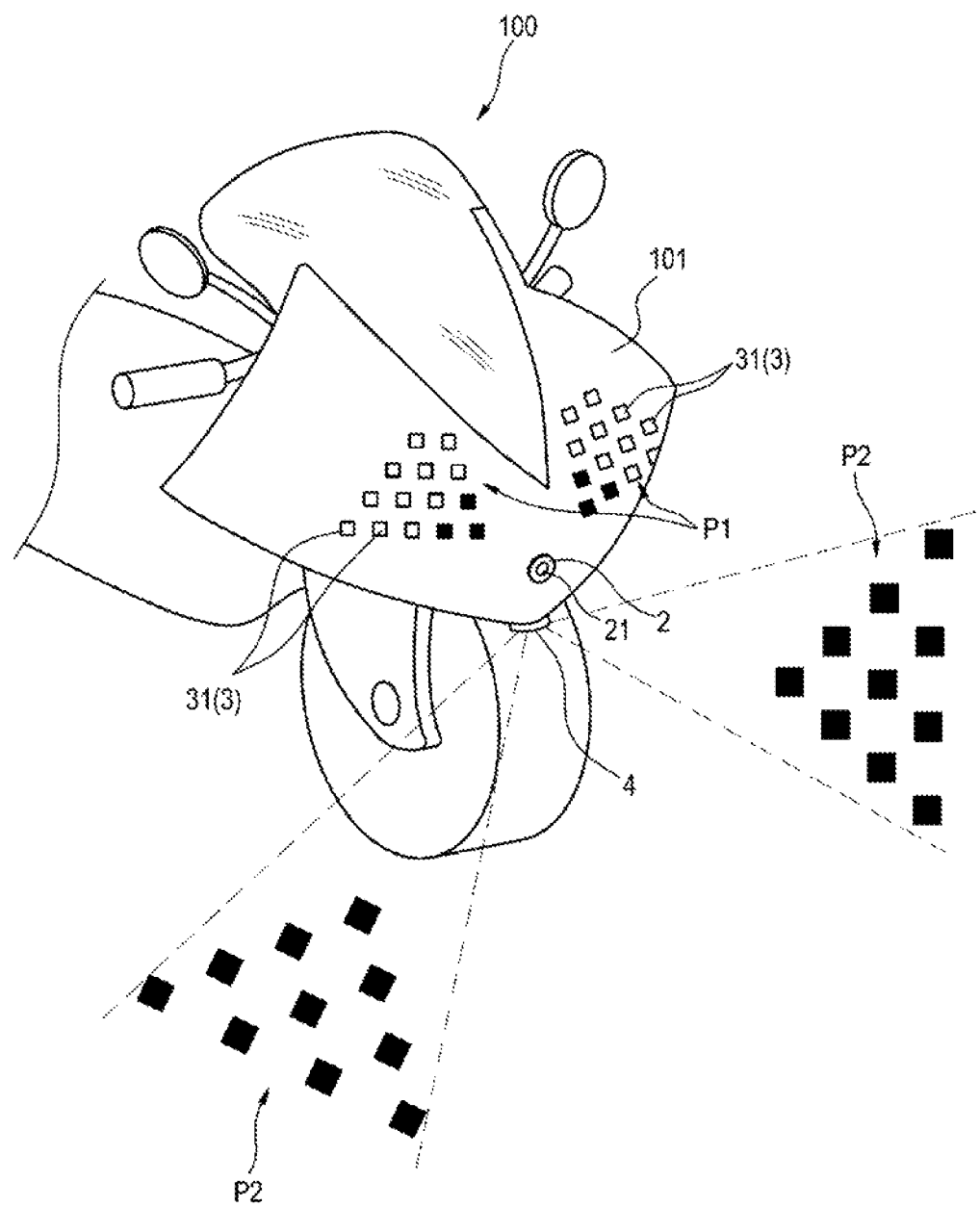
FIG. 5 is a view showing an example of a case where a light emission pattern of the communication lamp and a road surface drawing pattern of a road surface drawing lamp are formed in a stepwise manner.
Figure 6:
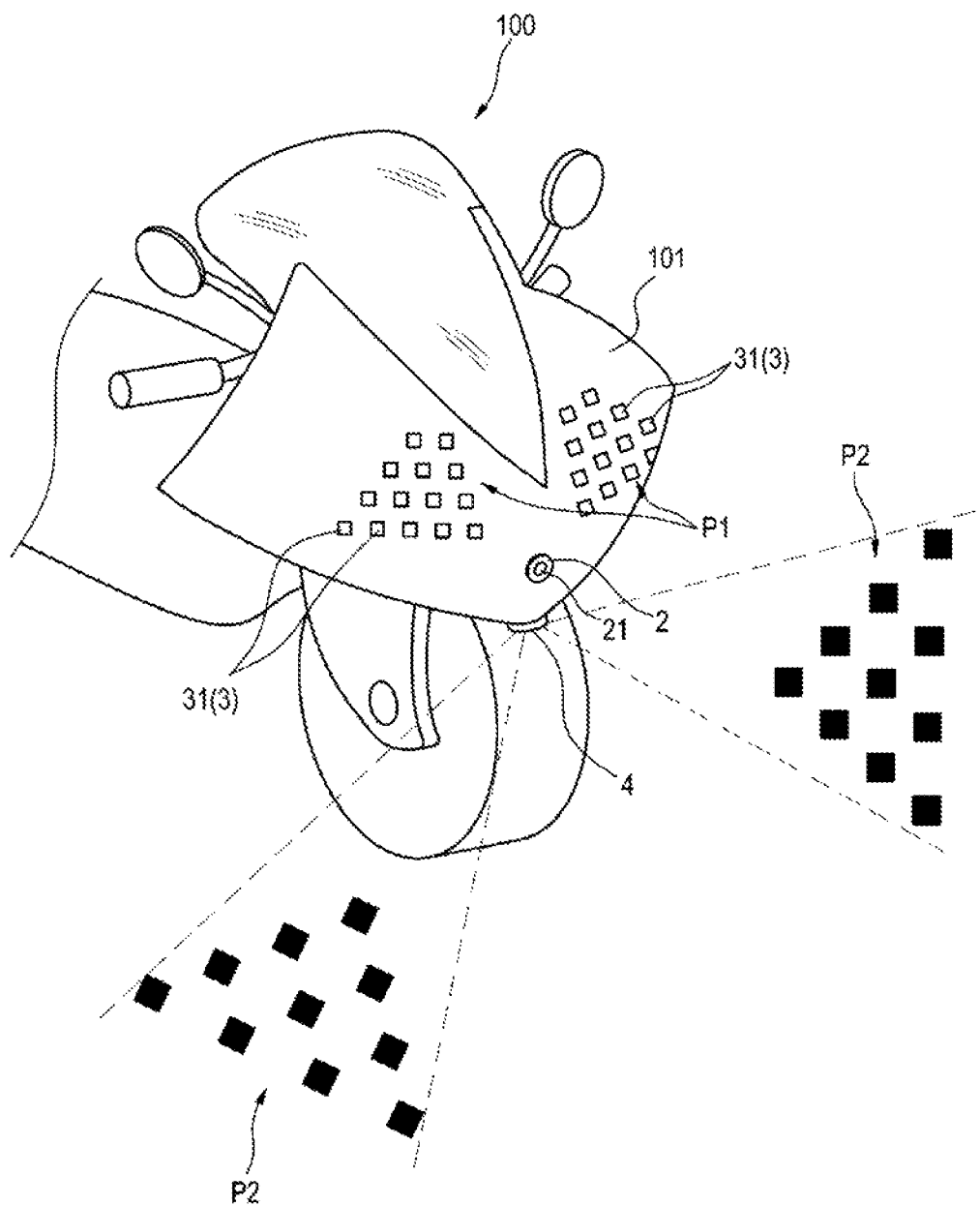
FIG. 6 is view showing an example of a case where a light emission pattern of the communication lamp and a road surface drawing pattern of the road surface drawing lamp are formed in a stepwise manner.
Figure 7:
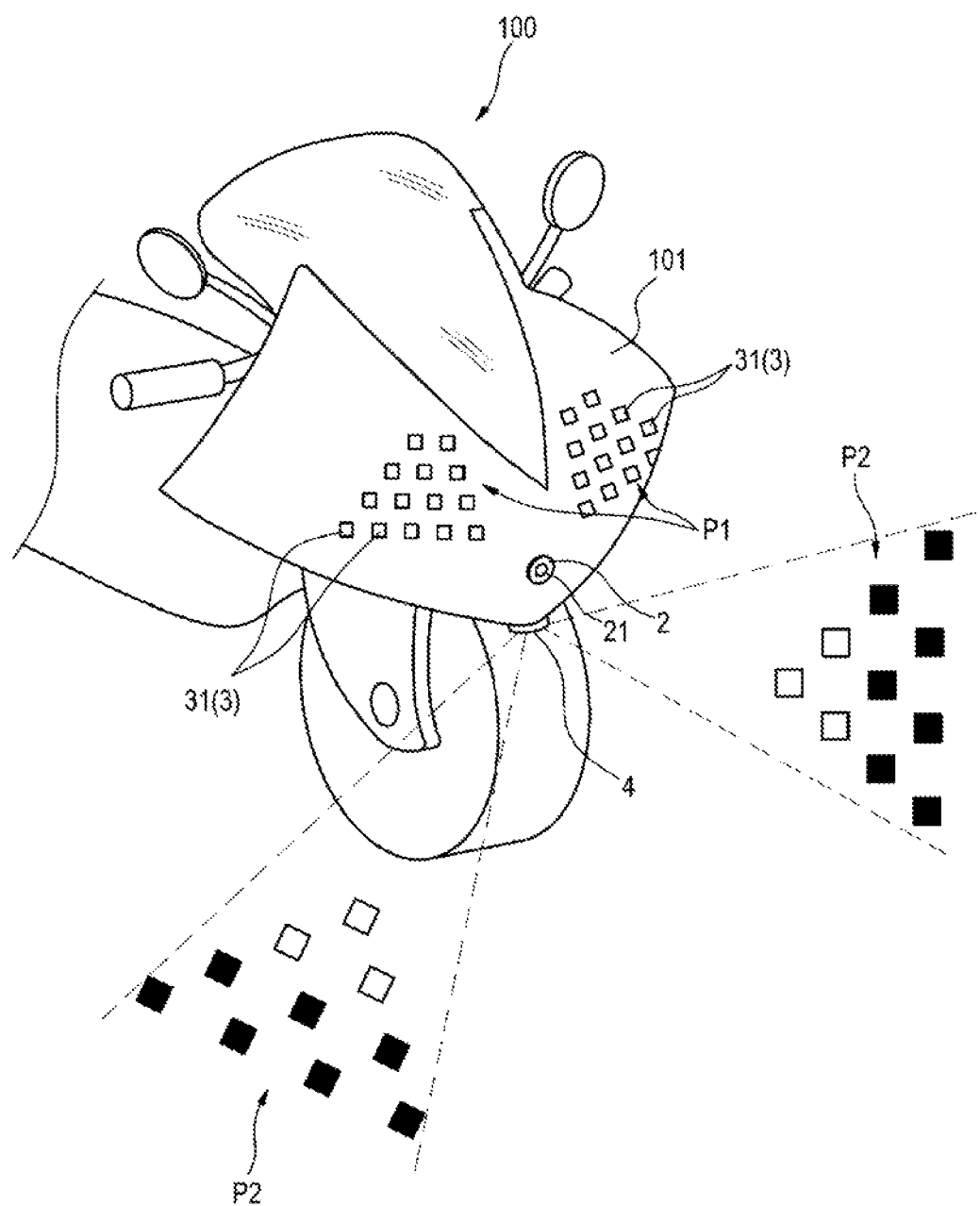
FIG. 7 is a view showing an example of a case where a light emission pattern of the communication lamp and a read surface drawing pattern of the road surface drawing lamp are thrilled in a stepwise manner.

As shown in FIGS. 5 to 7, the illumination control unit 5 may control light emission timings such that the light emission pattern P1 and the road surface drawing pattern P2 are formed by lighting and irradiation in a stepwise manner. In FIGS. 5 to 7, patterns P1, P2 displayed in white are portions that emit light or are irradiated, and the patterns P1, P2 painted in black are portions that do not emit light or are not irradiated. In this way, the illumination control unit 5 can performs lighting control on the plurality of light emitting segments 31 one by one or sequentially for each successive group, and can perform lighting control on light distribution units of the road surface drawing pattern) P2 one by one or sequentially for each successive group.

In the above embodiment, the communication lamp 3 includes the plurality of light emitting segments 31, but is not limited to thereto. For example, the communication lamp 3 may include a surface light emitting unit that emits light in an entire certain region of the cowl 101. For example, the surface light emitting unit may include an organic EL element such as an organic light emitting diode (OLED) or a light emitting polymer.

Second Embodiment

Figure 8:
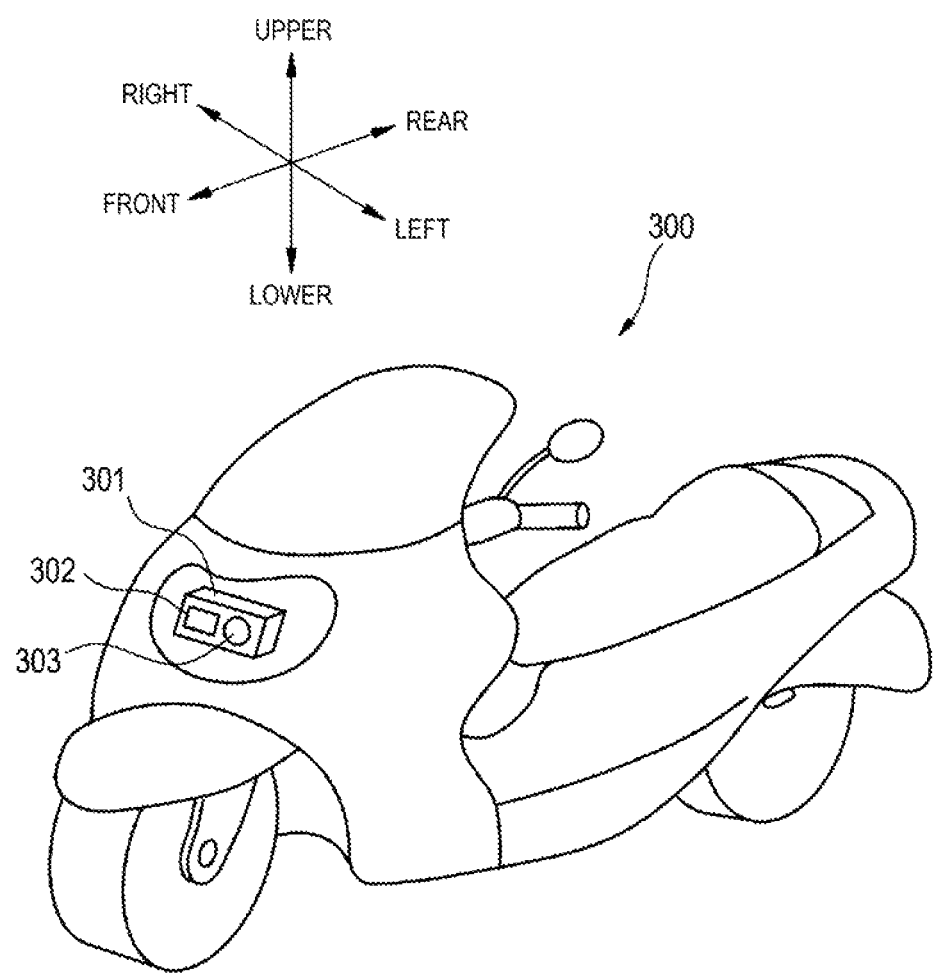
FIG. 8 is a perspective view showing an example of a vehicle according to a second embodiment of the present invention.

FIG. 8 shows a motorcycle as an example of a vehicle 300 according to a second embodiment. The motorcycle 300 is a vehicle capable of traveling around a corner (a curve) of a road by inclining a vehicle body toward a turning direction. The vehicle of the present embodiment may be any vehicle capable of traveling around, a corner by inclining the vehicle body toward a turning direction, such as the motorcycle 300, and the number of wheels is not limited. Therefore, for example, an automatic tricycle or an automobile is included in the vehicle of the present embodiment as long as the vehicle is capable of traveling in the same manner as the motorcycle 300.

As shown, in FIG. 8, a lamp unit 301 is mounted on a front portion of the motorcycle 300. The lamp unit 301 includes a road surface drawing lamp 302 capable of forming a drawing pattern on a road surface, and a headlamp 303 capable of irradiating ahead of the vehicle. Although the motorcycle 300 including one lamp unit 301 is illustrated in the present embodiment, the motorcycle 300 may be, for example, a motorcycle including one lamp unit on each of left and right sides. The road surface drawing lamp and the headlamp may be separated from each other at different positions, for example, the headlamp may be disposed in a center portion of the from portion of the vehicle, and the road surface drawing lamp may be disposed below the headlamp and at a position not easily visible form a front of the vehicle.

Figure 9:
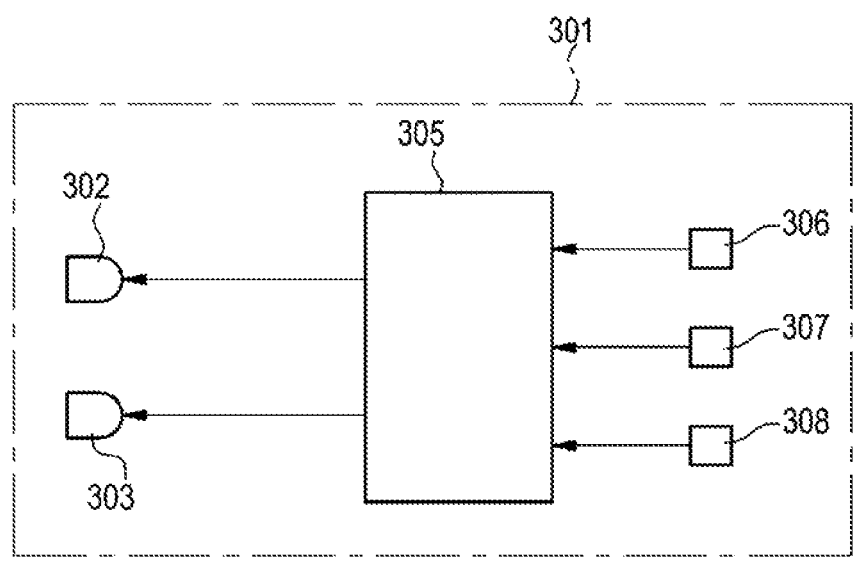
FIG. 9 is a block diagram of a lamp unit mounted on the vehicle in FIG. 8.

As shown in FIG. 9, the lamp unit 301 (a vehicle system) includes a lamp control unit 305 that controls operation of the road surface drawing lamp 302 and the headlamp 303. The road surface drawing lamp 302 and the head lamp 303 are connected to the lamp control unit 305. In addition, a bank angle sensor 306 (an example of a first sensor) that detects an inclination state of the motorcycle 300 and an external sensor 307 (an example of a second sensor) that detects environmental information outside the vehicle are connected to the lamp control unit 305. Further, a speed sensor 308 or the like that detects a speed of the motorcycle 300 are connected to the lamp control unit 305.

The information detected by the bank angle sensor 306, the external sensor 307 and the speed sensor 308 is transmitted to the lamp control unit 305. The lamp control unit 305 controls the operation of the road surface drawing lamp 302 and the headlamp 303 based on the information transmitted from the sensors 306 to 308. For example, the lamp control unit 305 can control the road surface drawing lamp 302 based on the information detected by the sensors 306 to 308 to adjust a shape of the drawing pattern drawn on the road surface. The lamp control unit 305 can control the headlamp 303 based on the information detected by the sensors to adjust a light distribution pattern formed in front of the vehicle.

Figure 10:
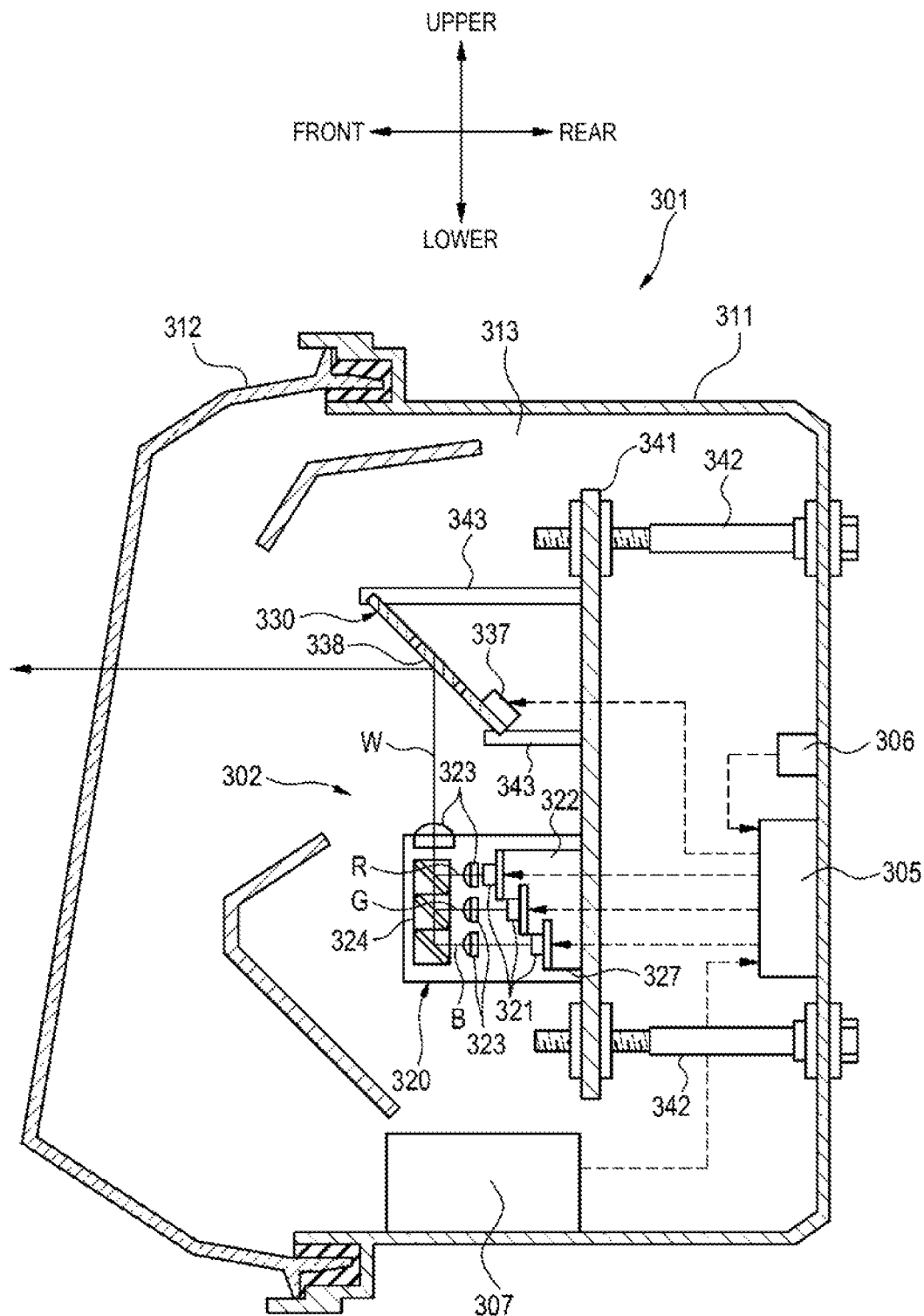
FIG. 10 is a vertical cross-sectional view showing a configuration of the lamp unit in FIG. 9.

FIG. 10 is a vertical cross-sectional view showing a schematic configuration of the road surface drawing lamp 302 of the lamp unit 301. As shown in FIG. 10, the lamp unit 301 includes a lamp body 311 having an opening at a front side of the vehicle, and a transparent front cover 312 attached so as to cover the opening of the lamp body 311. The road surface drawing lamp 302, the lamp control unit 305, the bank angle sensor 306 and the external sensor (for example, a LiDAR) 307 are accommodated in a lamp chamber 313 formed by the lamp body 311 and the front cover 312. Although not shown in the cross-sectional view of FIG. 10, the headlamp 303 is also accommodated in the lamp chamber 313 of the lamp unit 301 similarly to the road surface drawing lamp 302.

The road surface drawing lamp 302 includes a light source unit 320 and a light distribution unit 330 that reflects light from the light source unit 320. The light source unit 320 and the light distribution unit 330 are supported at predetermined positions in the lamp chamber 313 by a support plate 341. The support plate 341 is attached to the lamp body 311 via aiming screws 342.

The light source unit 320 includes a plurality of (three in this example) light sources 321, a heat sink 322, a plurality of (four in this example) lenses 323, and a light collection unit 324. The light source unit 320 is fixed to a front surface of the support plate 341. Each light source 321 is electrically connected to the lamp control unit 305.

The light distribution unit 330 includes a terminal portion 337 and a reflection mirror 338. The light distribution unit 330 has a predetermined positional relationship with the light source unit 320 such that laser light emitted from the light source unit 320 can be reflected toward a from of the road suffice drawing lamp 302 via the reflection mirror 338.

The light distribution unit 330 is fixed to a front end of a protrusion 343 protruding forward from the front surface of the support plate 341. The terminal portion 337 is electrically connected to the lamp control unit 305.

The lamp control unit 305 is fixed to the lamp body 311 rearward than the support plate 341. A position where the lamp control unit 305 is provided is not limited to this position. The road surface drawing lamp 302 is configured such that an optical axis can be adjusted horizontally and vertically by rotating the aiming screws 342 to adjust an attitude of the support plate 341.

Figure 11:
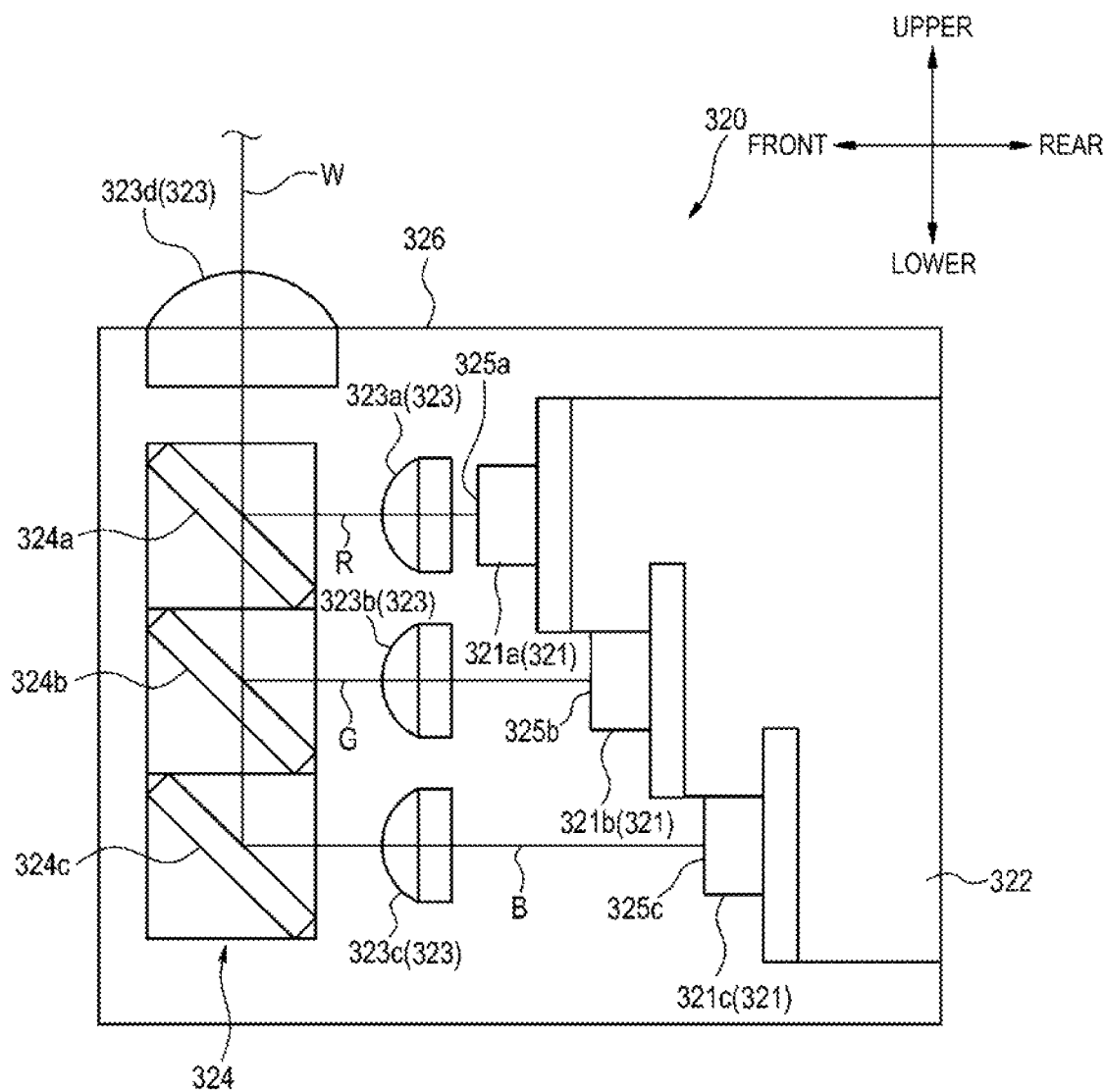
FIG. 11 is a side view showing a configuration of a light source unit of a road surface drawing lamp of the lamp unit in FIG. 9.

FIG. 11 is a side view of the light source unit 320 constituting the road surface drawing lamp 302. As shown in FIG. 11, the light source unit 320 includes a first light source 321$a$, a second light source 321$b$, a third light source 321$c$, the beat sink 322, a first lens 323$a$, a second lens 323$b$, a third lens 323$c$, a fourth lens 323$d$ and the light collection unit 324.

The first light source 321$a$ is a light source that emits red laser light R, and is formed of a light emitting element including a red laser diode. Similarly, the second light source 321$b$ is formed of a green laser diode that emits green laser light G, and the third light source 321$c$ is formed of a blue laser diode that emits blue laser light B. The first light source 321$a$, the second light source 321$b$ and the third light source 321$c$ are disposed such that the laser light emitting surface 325$a$, the laser light emitting surface 325$b$ and the laser light emitting surface 325$c$ serving as light emitting surfaces are parallel to each other. The light emitting element of each light source is not limited to a laser diode.

The first light source 321$a$ to the third light source 321$c$ are disposed such that the laser light emitting surfaces 325$a$ to 325$c$ face the front of the road surface thawing lamp 302, and are attached to the heat sink 322. The heat sink 322 is formed of a material having a high thermal conductivity such as aluminum, and is attached to the light source unit 320 in a state in which a rear side surface of the heat sink 322 is in contact with the support plate 341 (see FIG. 10).

The first lens 323$a$ to the fourth lens 323$d$ are formed of, for example, a collimating lens. The first lens 323$a$ is provided on an optical path of the red laser light R between the first light source 321$a$ and the light collection unit 324, converts the red laser light R emitted from the first light source 321$a$ into parallel light, and emits the parallel light to the light collection unit 324. The second lens 323$b$ is provided on an optical path of the green laser light G between the second light source 321$b$ and the light collection unit 324, converts the green laser light G emitted from the second light source 321$b$ into parallel light, and emits the parallel light to the light collection unit 324.

The third lens 323$c$ is provided, on an optical path of the blue laser light B between the third light source 321$c$ and the light collection unit 324, converts the blue laser light B emitted from the third light source 321$c$ into parallel light, and emits the parallel light to the light collection unit 324. The fourth lens 323$d$ is fitted into an opening provided in an upper portion of a housing 326 of the light source unit 320. The fourth lens 323$d$ is provided on an optical path of white laser light W (described below) between the light collection unit 324 and the light distribution unit 330 (see FIG. 10), converts the white laser light W emitted from the light collection unit 324 into parallel light, and emits the parallel light to the light distribution unit 330.

The light collection unit 324 collects the red laser light R, the green laser light G and the blue laser light B to generate the white laser light W. The light collection unit 324 includes a first dichroic mirror 324$a$, a second dichroic mirror 324$b$ and a third dichroic mirror 324$c$.

The first dichroic mirror 324$a$ is a mirror that reflects at least red light and transmits blue light and green light, and is disposed so as to reflect the red laser light R passing through the first lens 323$a$ toward the fourth lens 323$d$. The second dichroic mirror 324$b$ is a mirror that reflects at least green light and transmits blue light, and is disposed so as to reflect the green laser light G passing through the second, lens 323$b$ toward the fourth lens 323$d$. The third dichroic mirror 324c is a mirror that reflects at least blue light, and is disposed so as to reflect the blue laser light B passing through the third lens 323c toward the fourth lens 323d.

A positional relationship among the first dichroic mirror 324a to the third dichroic mirror 324c is determined such that optical paths of laser light reflected by the first dichroic mirror 324a to the third dichroic mirror 324c are parallel to each other and the laser light are collected and incident on the fourth lens 323d. In this example, the first dichroic mirror 324a to the third dichroic mirror 324c are disposed such that, regions of the dichroic mirrors 324a to 324c irradiated by the laser light (reflection points of the laser light) is aligned in a straight line.

The blue laser light B emitted from the third light source 321c is reflected by the third dichroic mirror 324c and proceeds to the second dichroic mirror 324b. The green laser light G emitted from the second light source 321b is reflected by the second dichroic mirror 324b toward the first dichroic mirror 324a, and is superimposed on the blue laser light B transmitted through the second dichroic mirror 324b. The red laser light R emitted from the first light source 321a is reflected by the first dichroic mirror 324a toward the fourth lens 323d, and is superimposed on the collected light of the blue laser light B and the green laser light G transmitted through the first dichroic mirror 324a. As a result, the white laser light W is formed, and the formed white laser light W passes through the fourth lens 323d and proceeds to the light distribution unit 330.

In the first light source 321a to the third light source 321c, the first light source 321a that emits the red laser light R is disposed at a position closest to the light collection unit 324, the third light source 321c that emits the blue laser light B is disposed farthest from the light collection unit 324, and the second light source 321b that emits the green laser light G is disposed at an intermediate position. That is, the first light source 321a to the third light source 321c are disposed at positions closer to the light collection unit 324 as a wavelength of the emitted laser light becomes longer.

Figure 12:
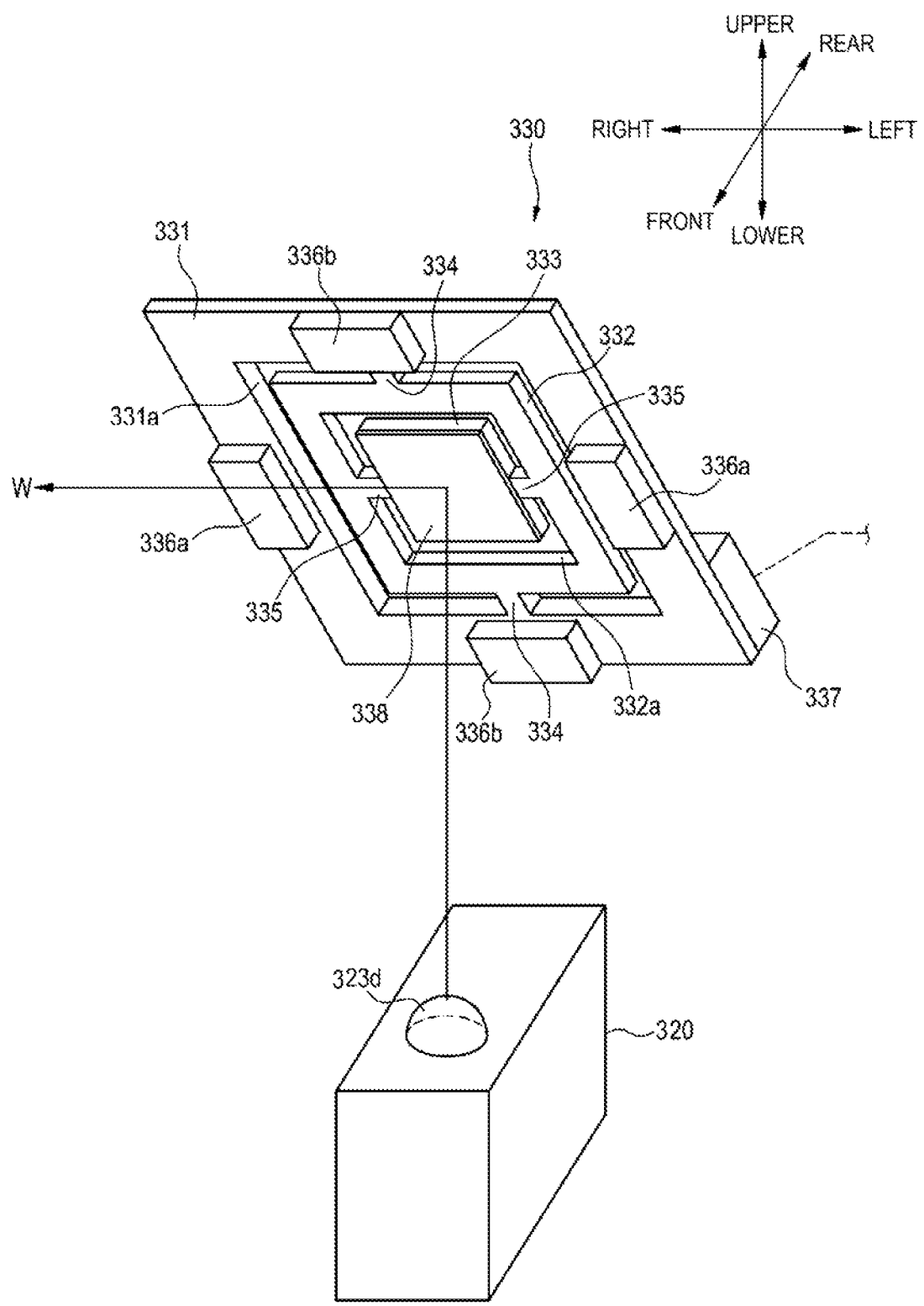
FIG. 12 is a perspective view showing a configuration of a light distribution unit of the road surface drawing lamp.

FIG. 12 is a perspective view of the light distribution unit 330 constituting the road surface drawing lamp 302 as viewed from a front side. As shown in FIG. 12, the light distribution unit 330 includes a base 331, a first rotation body 332, a second rotation body 333, a first torsion bar 334, a second torsion bar 335, permanent magnets 336a, 336b, a terminal portion 337 and a reflection mirror 338. The light distribution unit 330 includes, for example, a galvanomirror. The light distribution unit 330 may include, for example, a MEMS mirror.

The base 331 is a frame having an opening 331a at a center thereof, and is fixed to the protrusion 343 (set FIG. 10) in a state of being inclined in a front-rear direction of the road surface drawing lamp 302. The first rotation body 332 is disposed in the opening 331a of the base 331. The first rotation body 332 is a frame having an opening 332a at a center thereof, and is supported by the first torsion bar 334 extending from a rear lower side to a front upper side of the road surface drawing lamp 302 so as to be rotatable in a left and right direction (in a vehicle width direction) with respect to the base 331.

The second rotation body 333 is disposed in the opening 332a of the first rotation body 332. The second rotation body 333 is a rectangular flat plate and is supported by the second torsion bar 335 extending in the vehicle width direction so as to be rotatable in an upper-lower direction (vertically) with respect to the first rotation body 332. When the first rotation body 332 is rotated in the left and right direction about the first torsion bar 334a as a rotation axis, the second rotation body 333 is rotated in the left and right direction together with the first rotation body 332. The reflection mirror 338 is provided on a surface of the second rotation body 333 by plating, vapor deposition or the like.

The base 331 is provided with a pair of permanent magnets 336a at positions perpendicular to an extending direction of the first torsion bar 334. The permanent magnets 336a form a magnetic field perpendicular to the first torsion bar 334. A first coil (not shown) is wired to the first rotation body 332, and the first coil is connected to the lamp control unit 305 via the terminal portion 337. The base 331 is provided with a pair of permanent magnets 336b at positions perpendicular to an extending direction of the second torsion bar 335. The permanent magnets 336b form a magnetic field perpendicular to the second torsion bar 335. A second coil (not shown) is wired to the second rotation body 333, and the second coil is connected to the lamp control unit 305 via the terminal portion 337.

By controlling a magnitude and a direction of a current flowing through the first coil and the second coil, the first rotation body 332 and the second rotation body 333 perform reciprocating rotation in the left and right direction and the second rotation body 333 independently performs reciprocating rotation in the upper-lower direction. Thereby, the reflection mirror 338 performs reciprocating rotation in upper-lower and left-right directions.

A positional relationship between the light source unit 320 and the light distribution unit 330 are determined such that the white laser light W emitted from the light source unit 320 is reflected by the reflection mirror 338 toward the front of the road surface drawing lamp 302. The light distribution unit 330 scans a front of the motorcycle 300 with the white laser light W by reciprocating rotation of the reflection mirror 338. For example, the light distribution unit 330 scans a region of a drawing pattern to be formed with the white laser light W. Thereby, the white laser light W is distributed in the formation region of the drawing pattern, and a predetermined drawing pattern is formed in front of the motorcycle 300 (for example, on the road surface).

Figure 13:
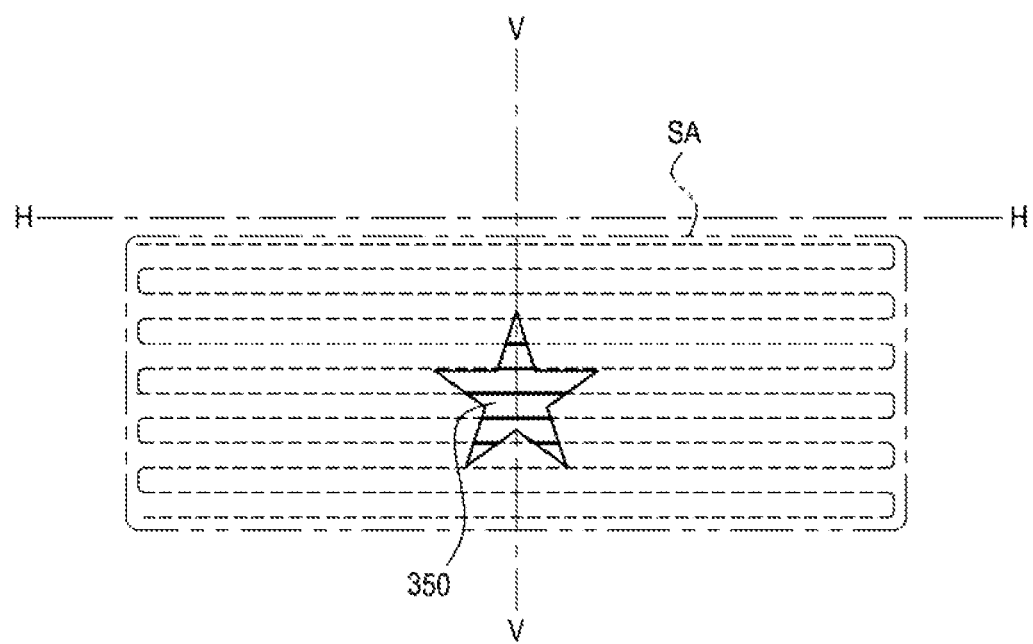
FIG. 13 is a view showing an example of a road surface drawing pattern formed by the road surface drawing lamp.

FIG. 13 is a view showing an example of the road surface drawing pattern formed by the road surface drawing lamp 302. A road surface drawing pattern 350 (a star-shaped drawing pattern in this example) shown in FIG. 13 is a road surface drawing pattern formed at a predetermined position on the road surface in front of the mad surface drawing lamp 302. H-H indicates a horizontal direction and V-V indicates a vertical direction.

The light distribution unit 330 of the road surface drawing lamp 302 can scan a rectangular scanning area SA extending in the vehicle width direction with the white laser light W. When a scanning position of the light distribution unit 330 is within the road surface drawing pattern to be drawn, the lamp control unit 305 controls each light source 321 to emit laser light from the light source 321. On the other hand, when the scanning position of the light distribution unit 330 is outside the road surface drawing pattern to be drawn, the lamp control unit 305 controls each light source 321 to stop emitting the laser light from the light source 321. Thereby, for example, the road surface drawing pattern having a predetermined shape such as the star-shaped drawing pattern 350 shown in FIG. 13 is formed.

Figure 14A:
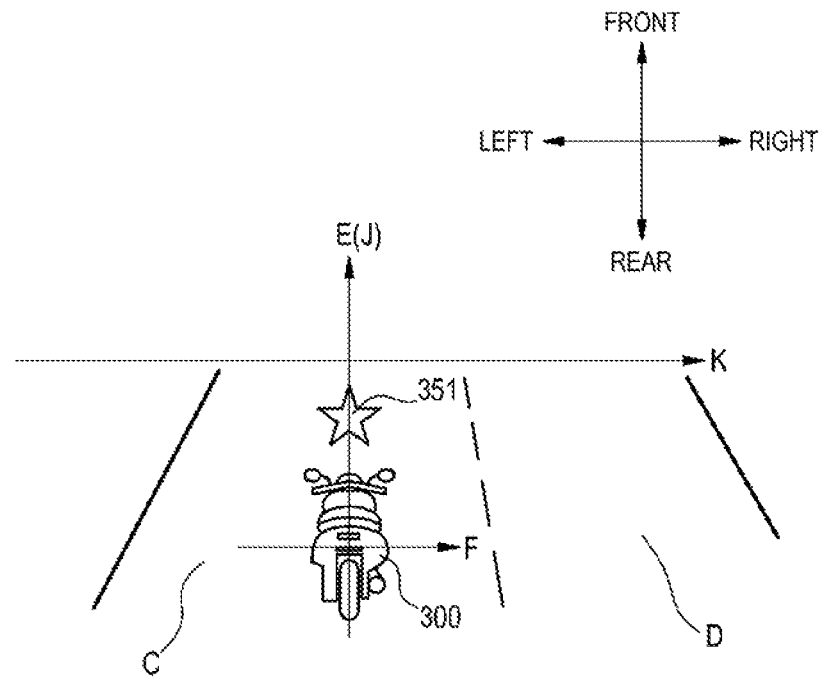
FIG. 14A is a view showing a road surface drawing pattern.
Figure 14B:
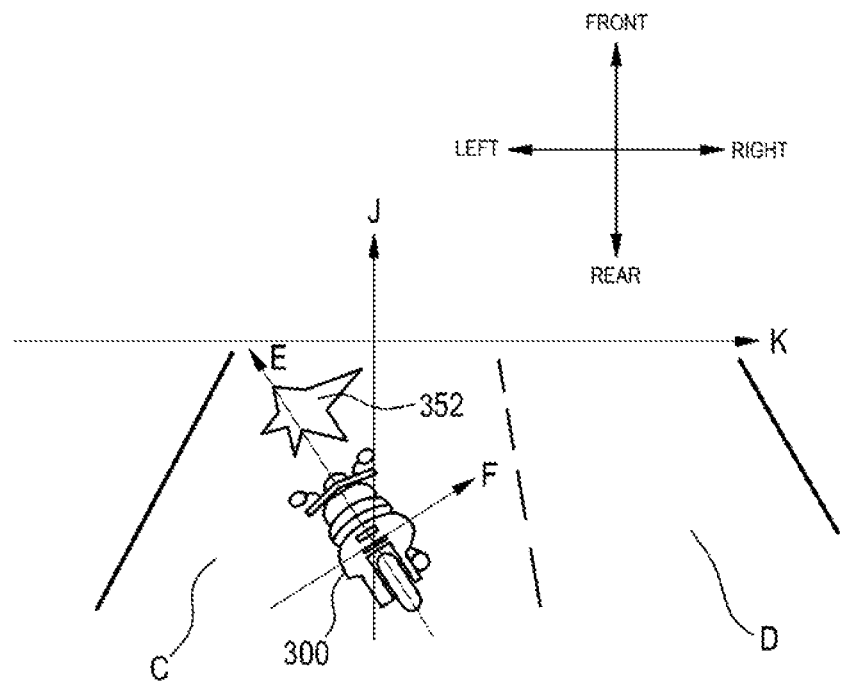
FIG. 14B is a view showing a road surface drawing pattern.
Figure 14C:
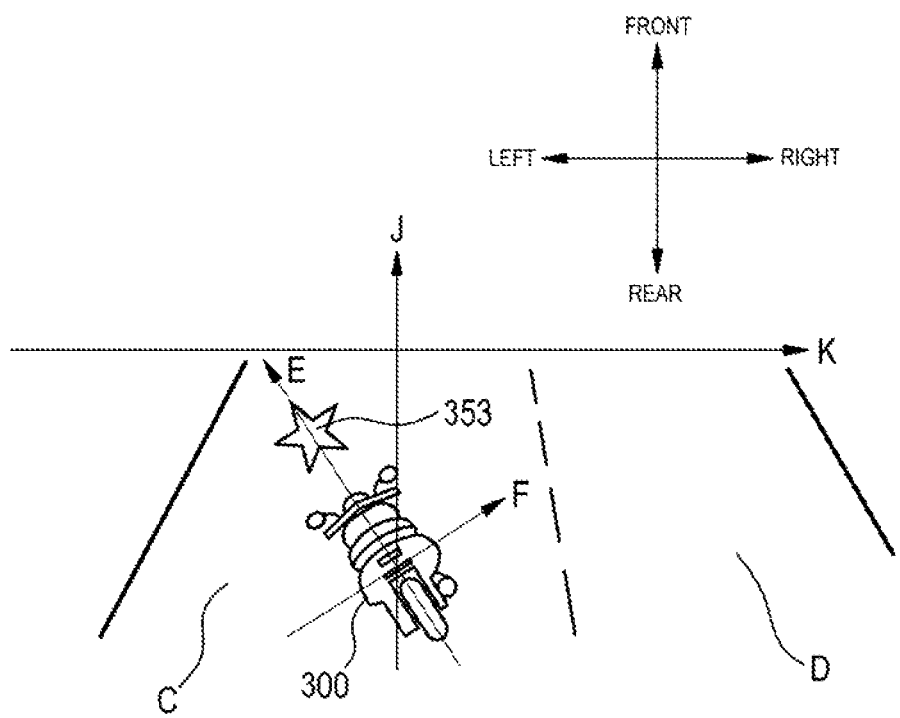
FIG. 14C is a view showing a road surface drawing pattern.

Next, a method of controlling the drawing pattern drawn on the road surface by irradiation of the road surface drawing lamp 302 will be described with reference to FIGS. 14A to 14C. FIGS. 14A to 14C show a state in which the motorcycle 300 is traveling along an own vehicle lane C on a road formed by the own lane C and an oncoming vehicle lane D. An arrow E indicates a traveling direction of the motorcycle 300, and an arrow J indicates a direction of the own vehicle lane C (in FIG. 14A, the arrow E and the arrow J indicate the same direction). An arrow K indicates a horizontal direction of the road.

FIG. 14A is a view showing a star-shaped drawing pattern 351 drawn on the road surface by the road surface drawing lamp 302 when the vehicle body of the motorcycle 300 is not inclined. FIG. 14B is a view showing a star-shaped drawing pattern 352 drawn on a road surface by a road surface drawing lamp (a mad surface drawing lamp in related art) having no adjustment function of the road surface drawing pattern when the vehicle body of the motorcycle 300 is inclined leftward. FIG. 14C is a view showing a star-shaped drawing pattern 353 drawn on the road surface by the road surface drawing lamp 302 of the present embodiment when the vehicle body of the motorcycle 300 is inclined leftward.

As shown, in FIG. 14A, when the motorcycle 300 is traveling with the vehicle body perpendicular to the road surface, for example, when traveling straight on a straight road, the white laser light W emitted from the road surface drawing lamp 302 is drawn on the road surface as the non-distorted star-shaped drawing pattern 351.

However, as shown in FIG. 14B, when the motorcycle 300 is traveling with the vehicle body inclined such as leftward with respect to the road surface, for example, when traveling with the vehicle body inclined to leftward so as to go toward a left side of the road, the emitted white laser light W is drawn on the road surface as the distorted star-shaped drawing pattern 352 by the road surface drawing lamp in related art. This is because an irradiation distance from the road surface drawing lamp to the road surface is different between a left region and a right region of the star-shaped drawing pattern 352 since a horizontal direction F of the motorcycle 300 is inclined with respect to the horizontal direction K of the road. For example, with reference to a line indicated by the arrow E that is the traveling direction of the motorcycle 300, the irradiation distance from the road surface drawing lamp to the road surface is reduced as the pattern goes leftward from the line E, and the irradiation distance from the mad surface drawing lamp to the road surface is increased as the pattern goes rightward from the line E. Therefore, a shape of the star-shaped drawing pattern 352 drawn on the road surface gradually becomes smaller in a region on the left of the line F as the shape goes leftward while the shape of the star-shaped drawing pattern 352 gradually becomes larger in a region an the right of the line as the shape goes rightward, and the shape of the star-shaped drawing pattern 352 is drawn on the road surface as the distorted star drawing pattern 352.

On the other hand, as shown in FIG. 14C, according, to the road surface drawing lamp 302 of the present embodiment, even when the motorcycle 300 is traveling with the vehicle body inclined leftward as described above, the emitted white laser light W is drawn on the road surface as the non-distorted star-shaped drawing pattern 353. This is because a shape of the star-shaped drawing pattern to be drawn by scanning of the light distribution unit 330 is adjusted by the lamp control unit 305 such that distortion due to inclination of the motorcycle 300 is corrected in accordance with the inclination.

The lamp control unit 305 acquires inclination angle information of the vehicle body of the motorcycle 300 detected by the bank angle sensor 306 from the bank angle sensor 306. The lamp control unit 305 acquires a state of the road surface on which the star-shaped drawing pattern 353 is drawn from the external sensor 307. Then, the lamp control unit 305 calculates a distance between the road surface and the road surface drawing lamp 302, that is, the irradiation distance at which the white laser light W is emitted, based on the acquired inclination angle information of the vehicle body and the road surface state.

The lamp control unit 305 calculates a distortion amount of the star-shaped drawing pattern generated when being drawn without correction and calculates a distortion correction amount necessary for correcting the distortion, based on information such as an inclination angle of the vehicle body and the irradiation distance of the white laser light W. In order to set the star-shaped drawing pattern on the road surface into a non-distorted star drawing pattern, the lamp control unit 305 determines a corrected star-shaped drawing pattern whose shape is corrected in advance depending on the distortion, based on the calculated distortion correction amount.

The lamp control unit 305 generates a control signal for drawing the corrected star-shaped drawing pattern, and transmits the control signal to the light distribution unit 330 and the light sources 321 (321*a* to 321*c*). The light distribution unit 330 and the light sources 321 (321*a* to 321*c*) than the corrected star-shaped drawing pattern based on the control signal. Thereby, as shown in FIG. 14C, the non-distorted star-shaped drawing pattern 353 is drawn on the road surface. That is, even when the vehicle body of the motorcycle 300 is inclined, drawing can be performed while maintaining the shape of the non-distorted star-shaped drawing pattern (the star-shaped drawing pattern 351 in FIG. 14A) drawn when the vehicle body is not inclined.

According to the motorcycle 300 (the vehicle system) configured as described above, the shape of the road surface drawing pattern can be corrected depending on the inclination state of the vehicle body. Therefore, even when the vehicle body is inclined during traveling, the shape of the road surface drawing pattern can be maintained in the same shape, and thus the road surface drawing pattern can be prevented from being mistakenly viewed. Therefore, appropriate information can always be provided to a driver of the motorcycle 300, an oncoming vehicle, a pedestrian and the like by the road surface drawing pattern.

Since the lamp unit 301 includes the hank angle sensor 306, the inclination state of the vehicle body can be accurately detected, and the detected inclination information can be appropriately reflected in formation of the road surface drawing pattern.

Since the lamp unit 301 includes the external sensor 307, the environmental information around the vehicle can be appropriately reflected in the formation of the road surface drawing pattern.

(First Modification)

A first modification of the road surface drawing pattern drawn on the road surface by the irradiation of the road surface drawing lamp 302 will be described with reference to FIGS. 15A and 15B. The road surface drawing pattern according to the first modification is different from the above embodiment in which the shape of the road surface drawing pattern is maintained in that the shape of the road surface drawing pattern changes depending on the inclination state of the vehicle body of the motorcycle 300. The same components as those in the above embodiment are denoted by the same reference numerals, and the description thereof is omitted as appropriate.

Figure 15A:
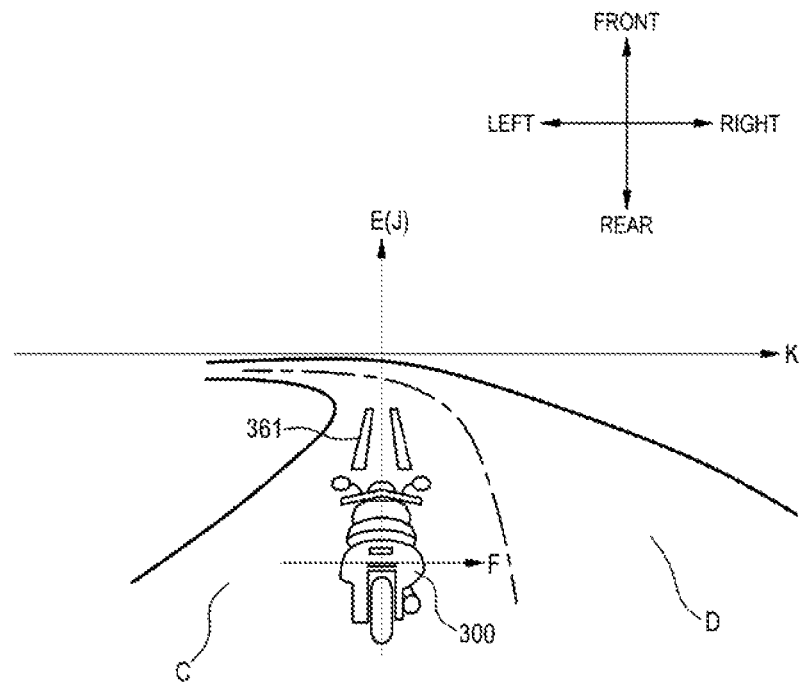
FIG. 15A is a view showing a first modification of the road surface drawing pattern.

FIG. 15A shows a guide drawing pattern 361 drawn on the road surface by the road surface drawing lamp 302 when the vehicle body of the motorcycle 300 is not inclined. FIG. 15B shows a guide drawing pattern 362 drawn on the road surface by the road surface drawing lamp 302 when the vehicle body of the motorcycle 300 is inclined leftward. The guide drawing pattern of the present example includes, for example, two guide bars, and indicates a direction in which the driver of the motorcycle 300 should proceed.

As shown, in FIG. 15A, when the motorcycle 300 is traveling with the vehicle body perpendicular to the road surface, for example, when traveling straight on a straight road, the white laser light W emitted from the road surface drawing lamp 302 is drawn on the road surface as the guide drawing pattern 361 having a shape in which the two guide bars are straight in parallel.

Figure 15B:
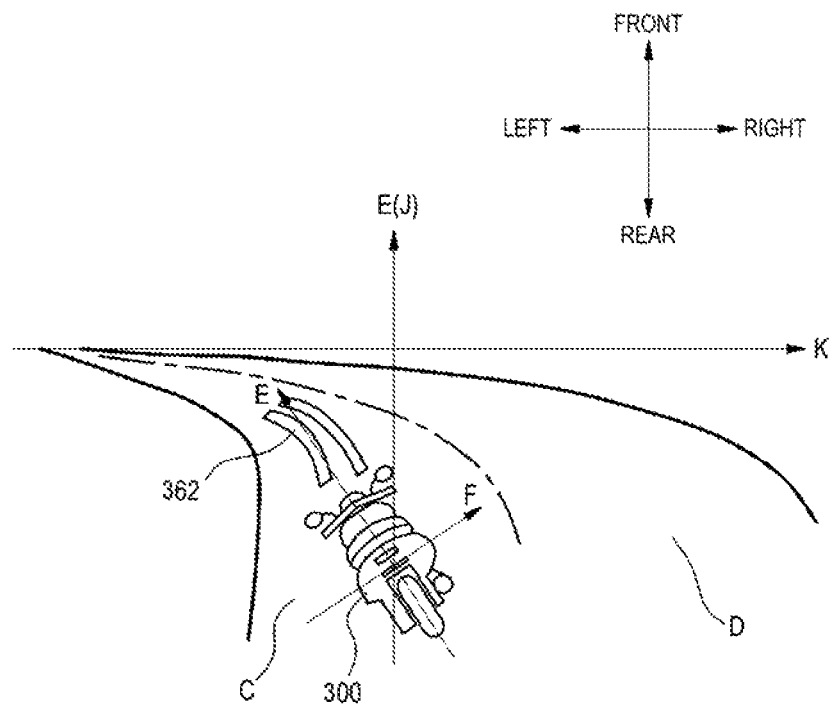
FIG. 15B is a view showing the first modification of the road surface drawing pattern.

On the other hand, as shown in FIG. 15B, when the motorcycle 300 is traveling with the vehicle body inclined such as leftward with respect to the road surface, for example, when the motorcycle 300 traveling around a left corner of the road, the white laser light W emitted from the road surface drawing lamp 302 is drawn on the road surface as the guide drawing pattern 362 having a shape in which the two guide bars are along the left corner of the road.

The lamp control unit 305 recognizes the corner of the traveling road based on the inclination angle information of the vehicle body detected by the bank angle sensor 306, and controls the light distribution unit 330 and the light sources 321 (321a to 321c) to form the guide drawing pattern 362 having a shape along the corner of the road. The lamp control unit 305 may recognize the corner of the road based on, for example, position information of a center line of the road detected by the external sensor 307, and form the guide drawing pattern 362 having a shape along the road, that is, a curved shape.

According to the vehicle system of the motorcycle 300 that can be formed by changing the shape of the road surface drawing pattern depending on the inclination of the vehicle body as described above, information necessary for safely traveling around the corner, for example, the guide drawing pattern 362 having a shape along the road can be provided to the driver of the motorcycle 300.

(Second Modification)

A second modification of the road surface drawing pattern drawn on the road surface by the irradiation of the road surface drawing lamp 302 will be described with reference to FIG. 16. The road surface drawing pattern according to the second modification is different from the first modification in that, when an obstacle is detected in the traveling direction of the motorcycle 300, an additional drawing pattern is added to the road surface drawing pattern and drawn on the road surface. The same components as those in the above embodiment are denoted by the same reference numerals, and the description thereof is omitted as appropriate.

Figure 16:
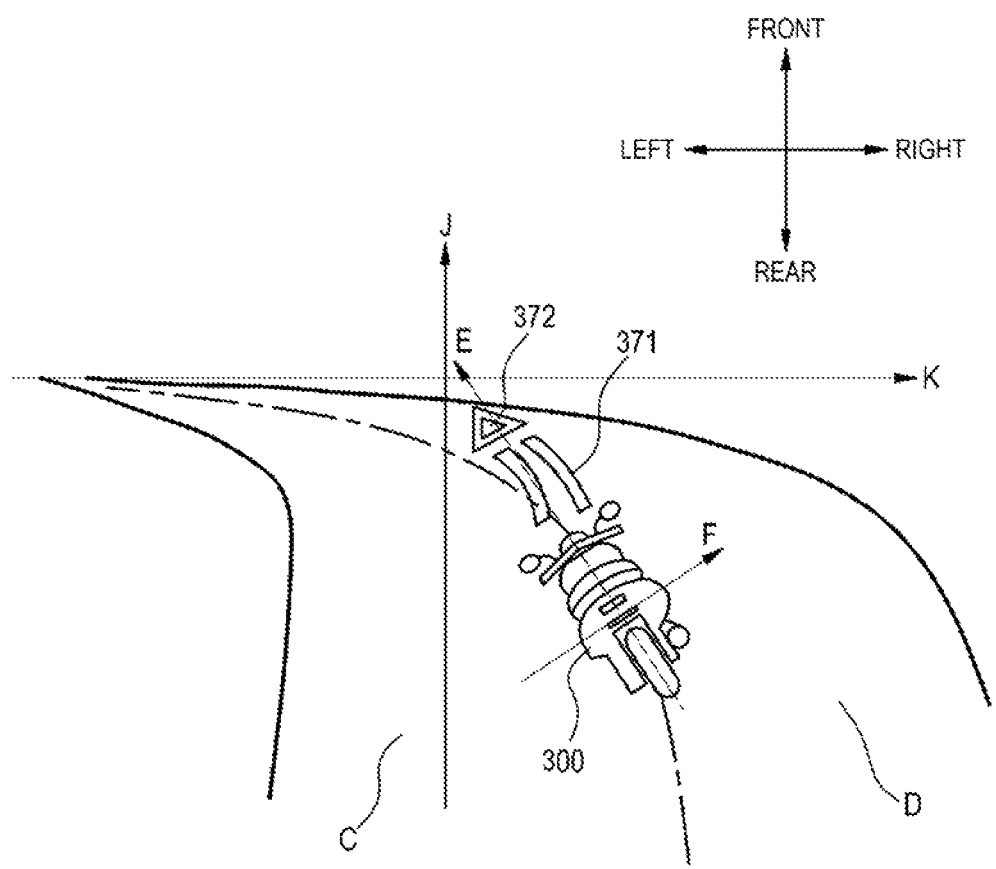
FIG. 16 is a view showing a second modification of the road surface drawing pattern.

FIG. 16 shows a state in which the motorcycle 300 is traveling around the left corner. As shown in FIG. 16, the motorcycle 300 is traveling in a state in which the motorcycle 300 does not turn around the corner, but goes toward the oncoming vehicle lane D beyond the center line without traveling on the own vehicle lane C.

In this case, since the vehicle body of the motorcycle 300 is inclined leftward with respect to the road surface, the two guide bars are drawn on the road surface in front of the motorcycle 300 in the traveling direction as a guide drawing pattern 371 having a curved shape along the left corner of the road as in FIG. 15B showing the first modification. Further, in order to inform the driver that the corner of the traveling road cannot be turned around, an additional drawing pattern 372 (for example, a triangle mark) is additionally drawn in front of the guide drawing pattern 371.

The lamp control unit 305 acquires, for example, the position information of the center line of the road detected by the external sensor 307, the inclination information of the motorcycle 300 detected by the bank angle sensor 306, and the traveling speed of the motorcycle 300 detected by the speed sensor 308. The lamp control unit 305 determines whether the corner can be turned around based on information such as the traveling position of the motorcycle 300 with respect to the center line, the inclination and the traveling speed of the motorcycle 300, and additionally draws the additional drawing pattern 372 when it is determined that the corner cannot be turned around. An object detected by the external sensor 307 in order to determine whether to add the additional drawing pattern is not to the center line, and may be, for example, a general obstacle including another vehicle, a pedestrian, a guardrail or the like existing ahead in the traveling direction.

For example, when an obstacle is detected, the lamp control unit 305 may draw the additional drawing pattern such as an arrow mark toward the obstacle on the road surface in order to inform the driver of a position of the obstacle. When the obstacle is detected, light distribution of the headlamp 303 may be controlled so as to strongly irradiate the detected obstacle with light. For example, when the speed detected by the speed sensor 308 exceeds a specified speed, the additional drawing pattern including characters such as "danger and slow down" may be drawn on the road surface. The lamp control unit 305 may change a position where the drawing pattern is drawn depending on the traveling speed of the motorcycle 300. For example, when the traveling speed is low, the drawing pattern may be drawn at a position close in the traveling direction of the motorcycle 300, and when the traveling speed is high, the drawing pattern may be drawn at a position far in the traveling direction of the motorcycle 300.

According to the vehicle system of the motorcycle 300 capable of additionally drawing the additional drawing pattern on the road surface, for example, when the obstacle is detected during traveling, the detection information can be appropriately reflected in the formation of the road surface drawing pattern.

In the above embodiment, the lamp control unit 305, the bank angle sensor 306 and the external sensor 307 are accommodated in the lamp chamber of the lamp unit 301, but the present invention is not limited thereto. The lamp control unit 305, the bank angle sensor 306 and the external sensor 307 may be disposed separately from the lamp unit 301.

Third Embodiment

Figure 17:
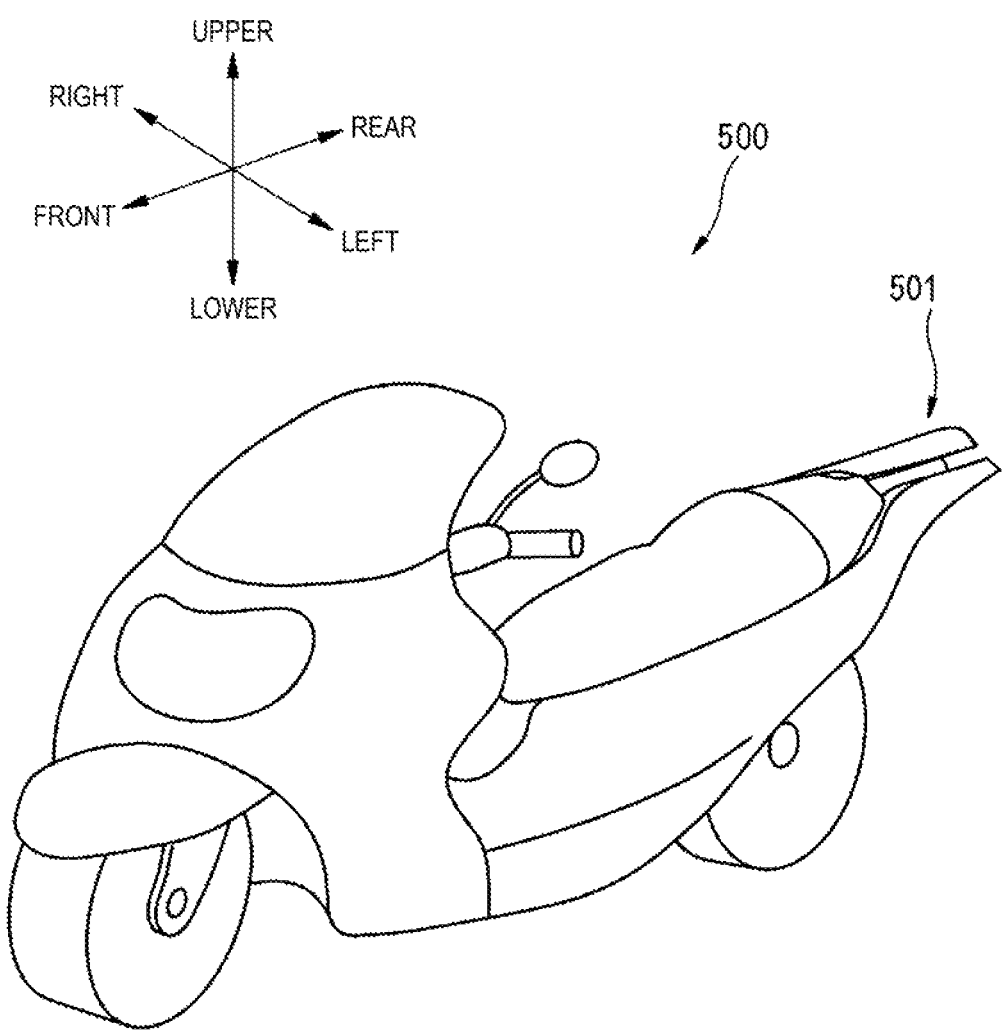
FIG. 17 is a partially enlarged perspective view of a vehicle including a vehicle lamp according to a third embodiment of the present invention.

FIG. 17 shows a motorcycle 500 as an example of a vehicle according to a third embodiment. The motorcycle 500 is a vehicle capable of traveling around a corner (a curve) of a road by inclining the vehicle body toward a turning direction. The vehicle of the present embodiment may be any vehicle capable of traveling around a corner by inclining the vehicle body toward a turning direction, such as the motorcycle 500, and the number of wheels is not limited. Therefore, for example, an automatic tricycle or an automobile is included in the vehicle of the present embodiment as long as the vehicle is capable of traveling in the same manner as the motorcycle 500.

Figure 18:
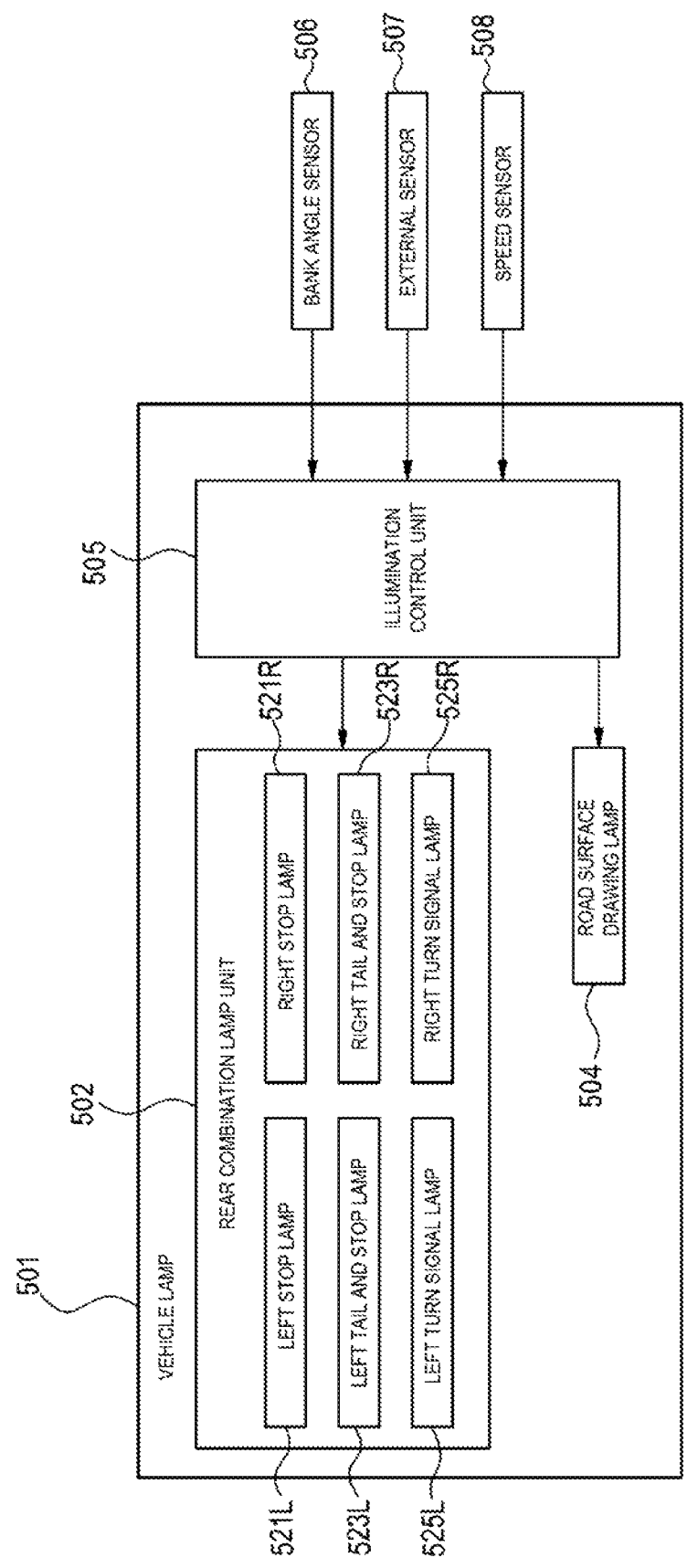
FIG. 18 is a block diagram of the vehicle lamp in FIG. 17.

As shown in FIG. 17, the motorcycle 500 includes a vehicle lamp 501 at a rear portion thereof. As shown in FIG. 18, the vehicle lamp 501 includes a rear combination lamp unit 502 capable of irradiating a rear side of the vehicle, a road surface drawing lamp 504 capable of forming a road surface drawing pattern on a road surface behind the vehicle, and an illumination control unit 505 that controls operation of the rear combination lamp unit 502 and the road surface drawing lamp 504.

The rear combination lamp unit 502 includes, for example, a left stop lamp 521L a right stop lamp 521R, a left tail and stop lamp 523L, a right tail and stop lamp 523R, a left turn signal lamp 525L, and a right turn signal lamp 525R.

The road surface drawing lamp 504 has a configuration for projecting (emitting) a predetermined drawing pattern on the road surface around the motorcycle 500. The road surface thawing lamp 504 may be, for example, a projector. In this example, the road surface drawing lamp 504 is capable of forming the predetermined road surface drawing pattern (for example, a road surface drawing pattern P in FIG. 25) on the road surface behind the motorcycle 500.

The rear combination lamp unit 502 and the road surface drawing lamp 504 are connected to the illumination control unit 505. In addition, a bank angle sensor 506 that detects an inclination state (a bank angle) of the motorcycle 500 and an external sensor 507 (an example of a detection unit) that detects environmental information outside the vehicle are connected to the illumination control unit 505. Further, a speed sensor 508 or the like that detects a speed of the motorcycle 500 are connected to the illumination control unit 505. The illumination control unit 505, the bank angle sensor 506, the external sensor 507 and the speed sensor 508 are mounted at predetermined positions on the vehicle body of the motorcycle 500. The illumination nation control unit 505 may be implemented to function as an integrated control unit (a vehicle electronic control unit (ECU)) mounted on the motorcycle 500, or may be implemented to function as a control device disposed in a lamp chamber of the rear combination lamp unit 502 or the road surface drawing lamp 504.

The illumination control unit 505 includes, for example, at least one electronic control unit (the ECU). The electronic control unit may include at least one microcontroller including one or more processors and one or more memories, and other electronic circuits including active elements such as transistors and passive elements. The processor is, for example, a central processing unit (a CPU), a micro processing unit (an MPU), a graphics processing unit (a GPU), and/or a tensor processing unit (a TPU). The CPU may include a plurality of CPU cores. The GPU may include a plurality of GPU cores. The memory includes a read only memory (a ROM) and a random access memory (a RAM). The ROM may store a vehicle control program. For example, the vehicle control program may include an artificial intelligence (AI) program for automatic driving. The AI program is a program constructed by supervised or unsupervised machine learning using a neural network such as deep learning. The RAM may temporarily store a vehicle control program, vehicle control data, and/or surrounding environment information indicating a surrounding environment of the vehicle. The processor may be configured to load the program specified by the vehicle control program stored in a storage device or the ROM onto the RAM and execute various processing in cooperation with the RAM.

The electronic control unit may include an integrated circuit (hardware resource) such as an application specific integrated circuit (an ASIC) or a field-programmable gate array (a FPGA). The electronic control unit may include a combination of at least one microcontroller and the integrated circuit.

The information detected by the bank angle sensor 506, the external sensor 507 and the speed sensor 508 is transmitted to the illumination control unit 305. The illumination control unit 505 controls operation of lamps of the rear combination lamp unit 502 and the road surface drawing lamp 504 based on the information transmitted from the sensors 506 to 508. For example, the illumination control unit 505 can control the lamps of the rear combination lamp unit 502 based on the information detected by the sensors 506 to 508 to adjust an illumination pattern visible from around (particularly, the rear side) of the motorcycle 500. The illumination control unit 505 can control the road surface drawing lamp 504 based on the information detected by the sensors 506 to 508 to adjust the road surface drawing pattern formed on the road surface behind the motorcycle 500.

Figure 19:
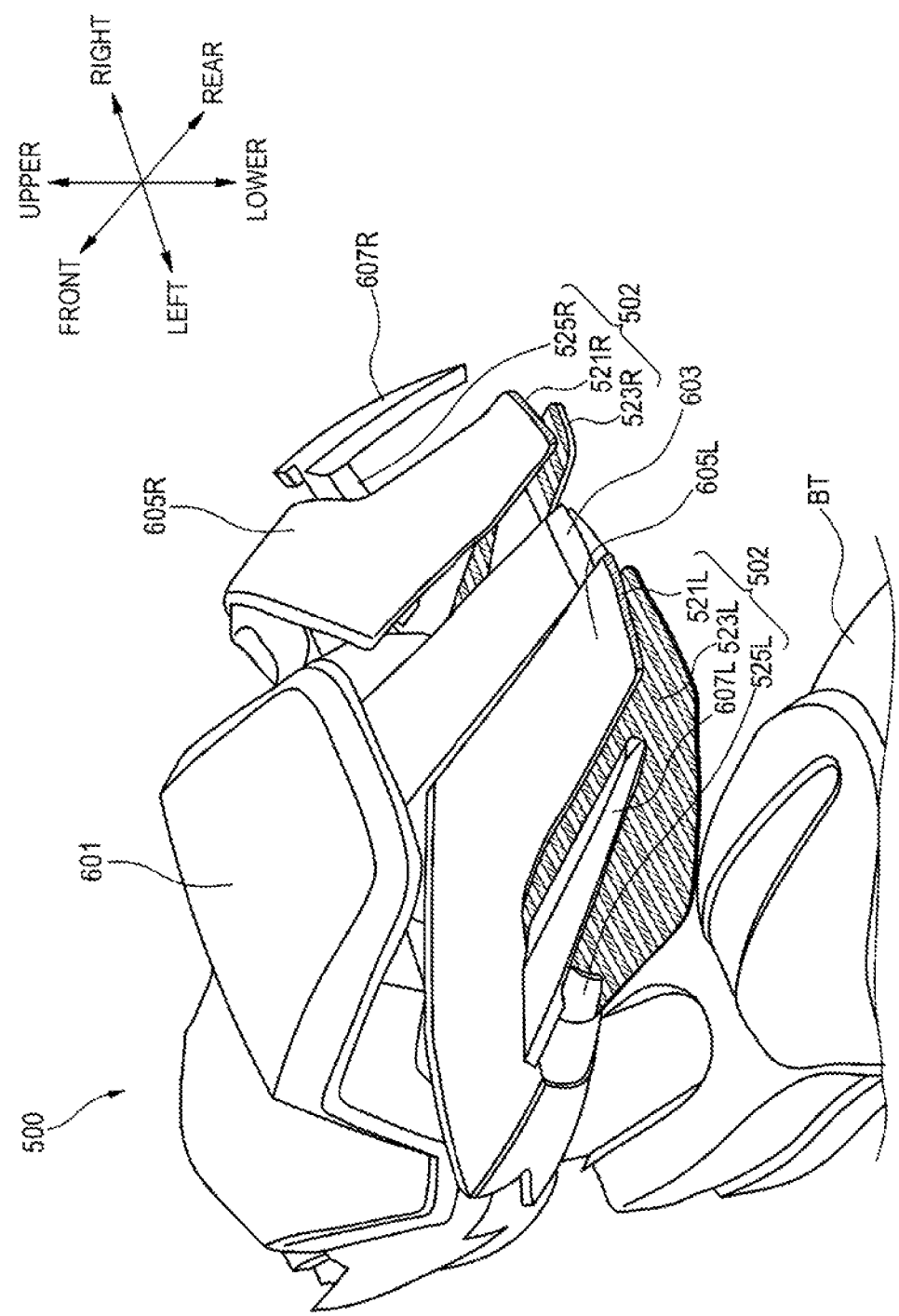
FIG. 19 is a top perspective view of the vehicle lamp in FIG. 17.
Figure 20:
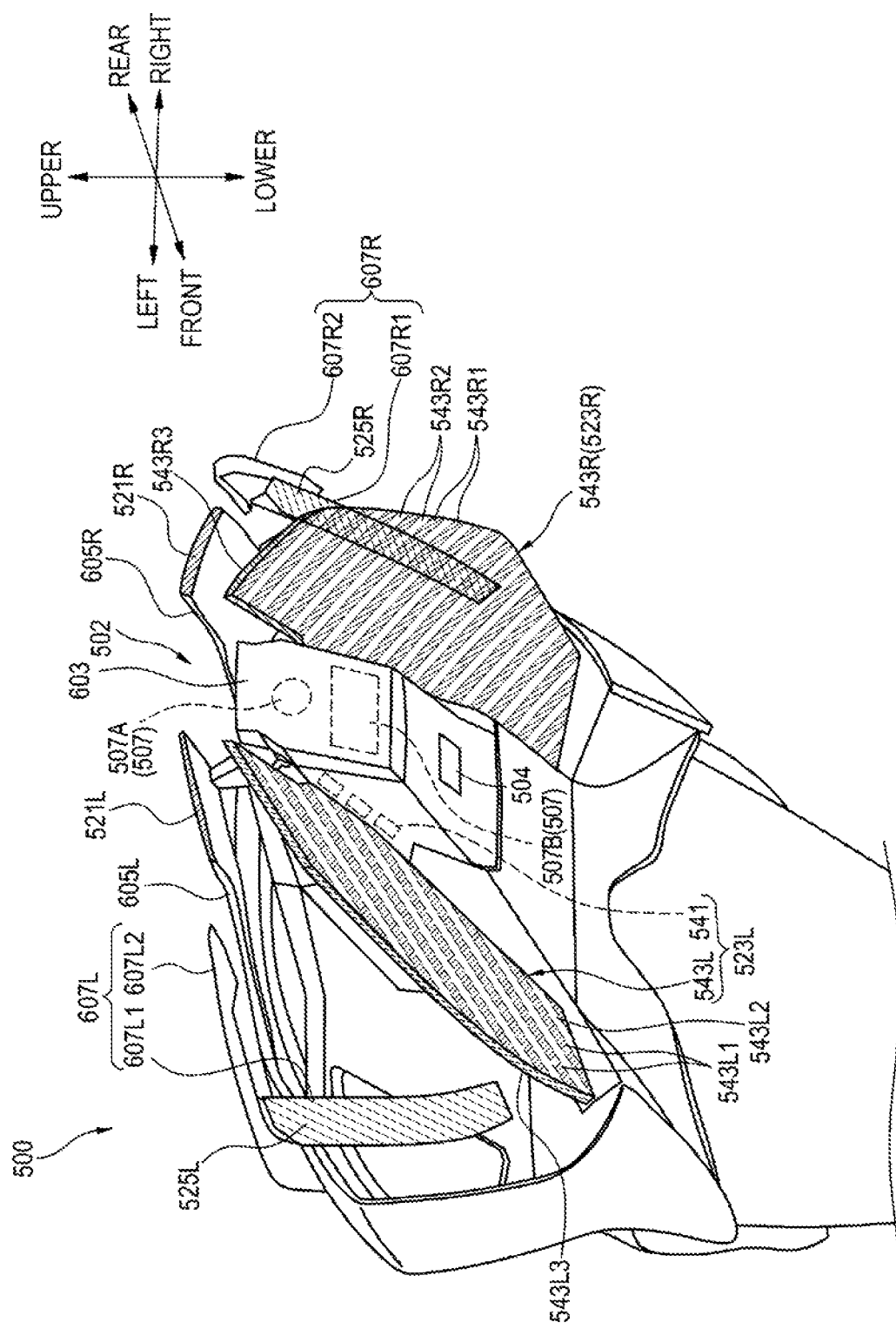
FIG. 20 is a bottom perspective view of the vehicle lamp in FIG. 17.
Figure 21:
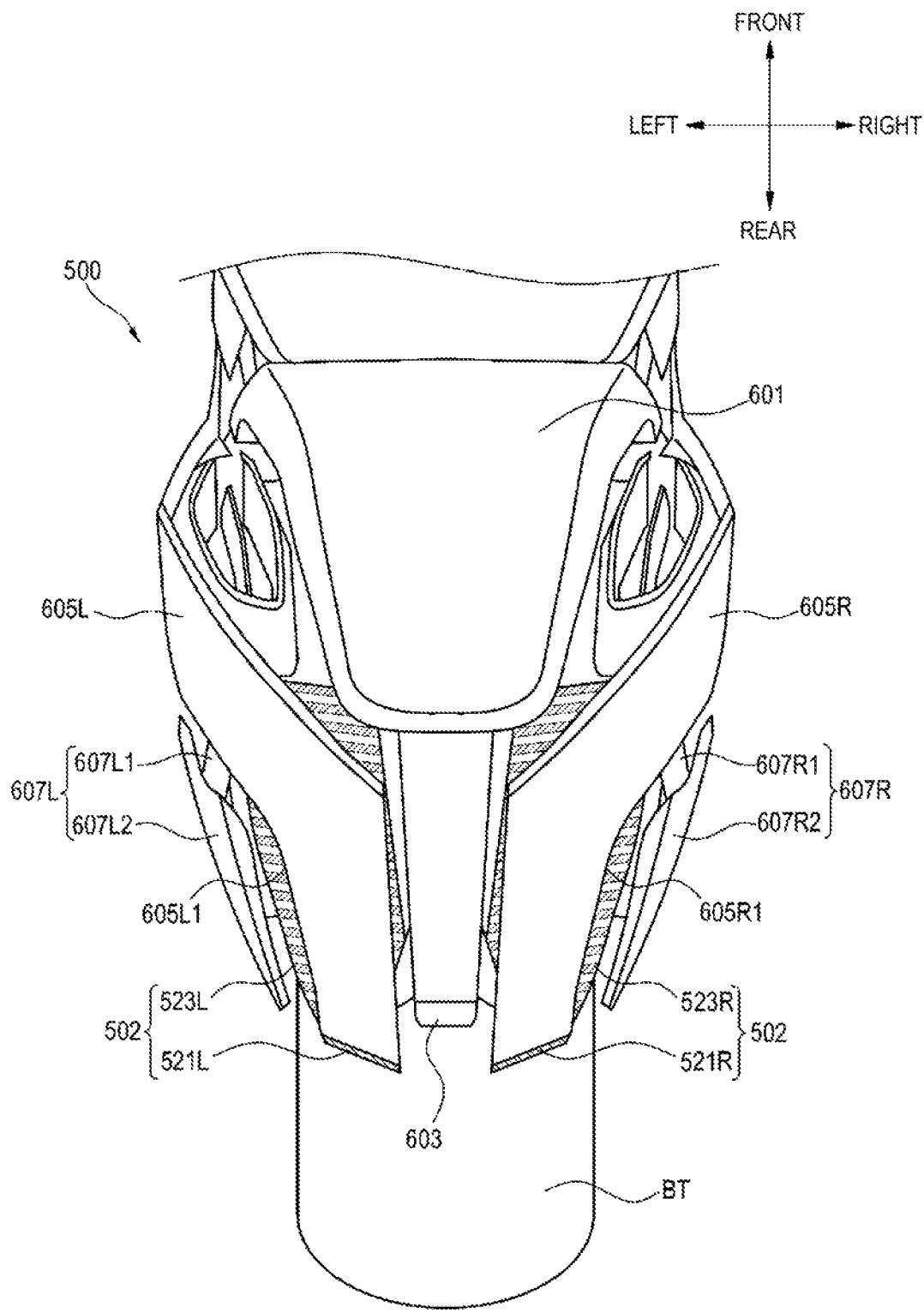
FIG. 21 is a lop view of the vehicle lamp in FIG. 17.
Figure 22:
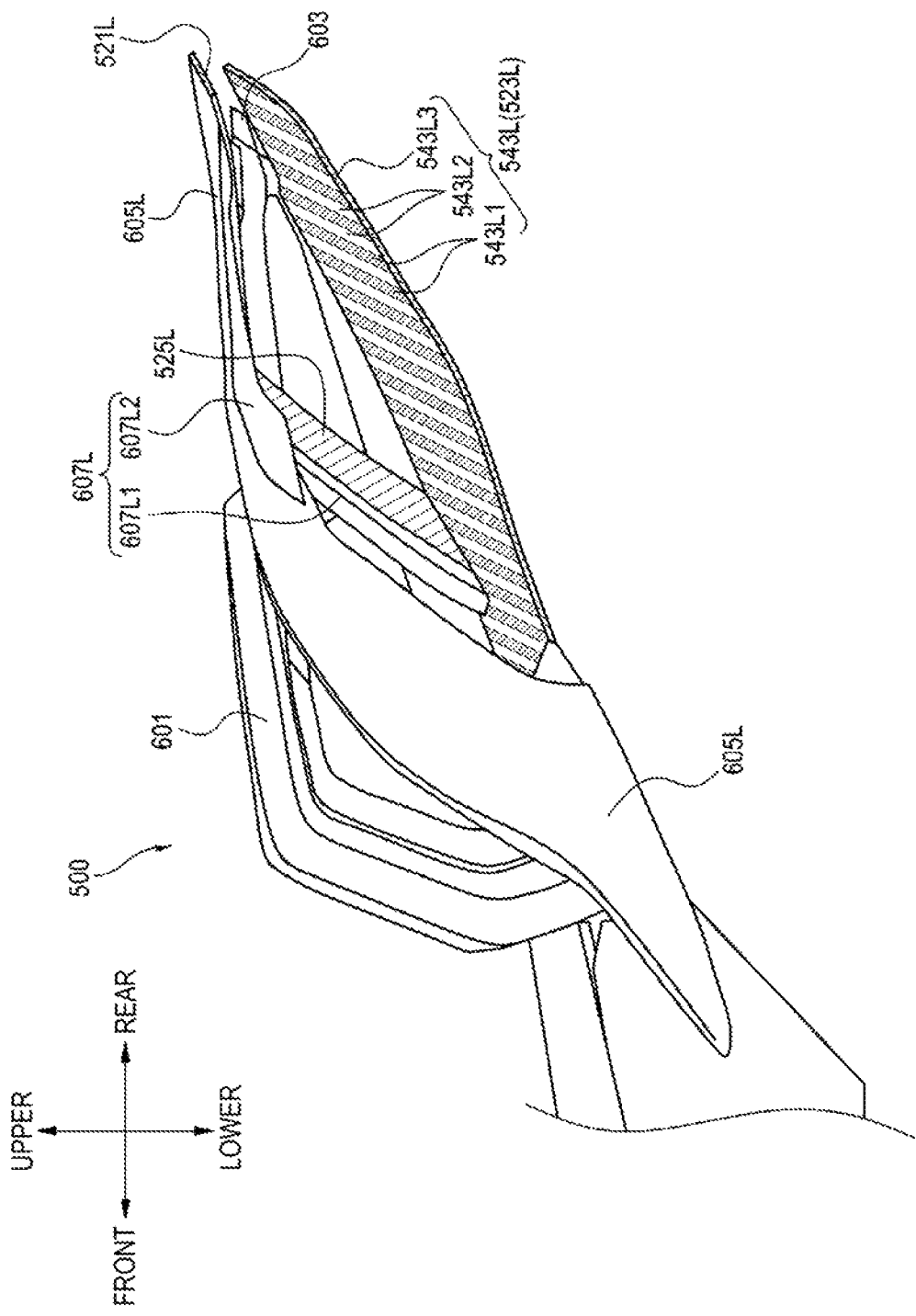
FIG. 22 is a left side view of the vehicle lamp in FIG. 17.

FIG. 19 is a top perspective view of the vehicle lamp 501 mounted on the motorcycle 500 in FIG. 17, and FIG. 20 is a bottom perspective view of the vehicle lamp 501. FIG. 21 is a top view of the vehicle lamp 501, and FIG. 22 is a left side view of the vehicle lamp 501.

As shown in FIGS. 19 to 22, a protrusion 603 protruding rearward from a tandem seat 601 is provided at the rear portion of the motorcycle 500. A camera 507A and a LiDAR 507B are mounted on a rear end side of the protrusion 603 as examples of the external sensor 507. That is, the environment information on the rear side of the motorcycle 500 can be acquired by the camera 507A and the LiDAR 507B.

First cowls 605L, 605R and second cowls 607L, 607R are provided as vehicle body covers that reduce air resistance in the rear portion of the motorcycle 500.

The pair of left and right first cowls 605L, 605R are attached below the tandem seat 601 and are disposed to extend upward and obliquely rearward. As shown in FIG. 20, the left first cowl 605L is formed in a curved shape so as to form a space where the left tail and stop lamp 523L and the left turn signal lamp 525L of the rear combination lamp unit 502 described below can be disposed on a left side of the protrusion 603 on which the camera 507A and LiDAR 507B are mounted as view from the rear side of the vehicle. The right fast cowl 605R is limped in a curved shape so as to form a space where the right tail and stop lamp 523R and the right turn signal lamp 525R of the rear combination lamp unit 502 can be disposed on a right side of the protrusion 603 as view from the rear side of the vehicle.

The pair of left and right second cowls 607L, 607R are respectively disposed outside bent portions 605L1, 605R1 of the first cowls 605L and 605R formed in a substantially L-shape as viewed from above the vehicle. The left second cowl 607L includes a first region 607L1 extending in an upper-lower direction and a second region 607L2 extending in a front-rear direction from an upper end of the first region 607L1. The right second cowl 607R includes a first region 607R1 extending in the upper-lower direction and a second region 607R2 extending in the front-rear direction from an upper end of the first region 607R1.

Light-emitting units each including a light source and a light guide (not shown) are respectively provided on rear end surfaces of the left and right first cowls 605L, 605R, and the light emitting units respectively function as the left stop lamp 521L and the right stop lamp 521R.

The left tail and stop lamp 523L, and the right tail and stop lamp 523R are respectively disposed on a left side surface and a right side surface of the protrusion 603. The left tail and stop lamp 523L and the right tail and stop lamp 523R respectively include a plurality of light sources 541 (light sources of the right tail and stop lamp 523R are not shown)

and light guides 543L, 543R (an example of optical members) that diffuse light emitted from the plurality of light sources 541. As shown by broken lines in FIG. 20, the plurality of light sources 541 are provided inside the protrusion 603. A lamp light source or a light emitting element can be used as the light source 541. Examples of the lamp light source include an incandescent lamp, a halogen lamp, a discharge lamp, a neon lamp and the like. Examples of the light emitting element include a light emitting diode, a laser diode, an organic EL element and the like.

The light guides 543L, 543R are formed as flat plates having a substantially rectangular shape, and are disposed so as to protrude in a left-right direction respectively from the protrusion portion 603. The light guides 543L, 543R are formed of a transparent resin material. Examples of the resin material used for the light guides 543L, 543R include a transparent thermoplastic resin or a thermosetting resin such as a polycarbonate resin and an acrylic resin.

The light guides 543L, 543R include first light emitting regions 543L, 543R1 that diffusely radiate light emitted from the light sources 541, and light non-emitting regions 543L2, 543R2 that do not diffusely radiate light emitted from the light sources 541. The light guides 543L, 543R are configured such that the strip-shaped first light emitting regions 543L1, 543R1 and the band-shaped light non-emitting regions 543L2, 543R2 are alternately disposed to form a stripe pattern. The first light emitting regions 543L1, 543R1 are formed of for example, a resin material having a light transmitting property and containing a light diffusing material that diffuses the light emitted from the light sources 541. Thereby, the first light emitting regions 543L1, 543R1 can diffusely radiate the light emitted from the light sources 541. Examples of the light diffusing material include titanium dioxide particles. The light non-emitting regions 543L2, 543R2 do not contain a light diffusing material. Therefore, the light emitted from the light sources 541 is not diffused.

The light guides 543L, 543R further include second light emitting regions 543L3, 543R3 disposed respectively on outer edges thereof and containing a light diffusing material. Density of the light diffusing material contained in the second light emitting regions 543L3, 543R3 is set to be higher than density of the light diffusing material contained in the first light emitting regions 543L1, 543R1. Thereby, light emission intensity of the second light emitting regions 543L3, 543R3 is higher than light emission intensity of the first light emitting regions 543L1, 543R1.

Light-emitting units each including a light source and a light guide (not shown) are respectively provided in first regions 607L1, 607R1 of the left and right second cowls 607L, 607R. The light emitting units respectively function as the left turn signal lamp 525L and the right turn signal lamp 525R. That is, the left turn signal lamp 525L is disposed on the side of the vehicle frontward than the light guide 543L functioning as the left tail and slop lamp 523L. Similarly, the right turn signal lamp 525R is disposed on the side of the vehicle frontward than the light guide 543R functioning as the right tail and stop lamp 523R.

Figure 25:
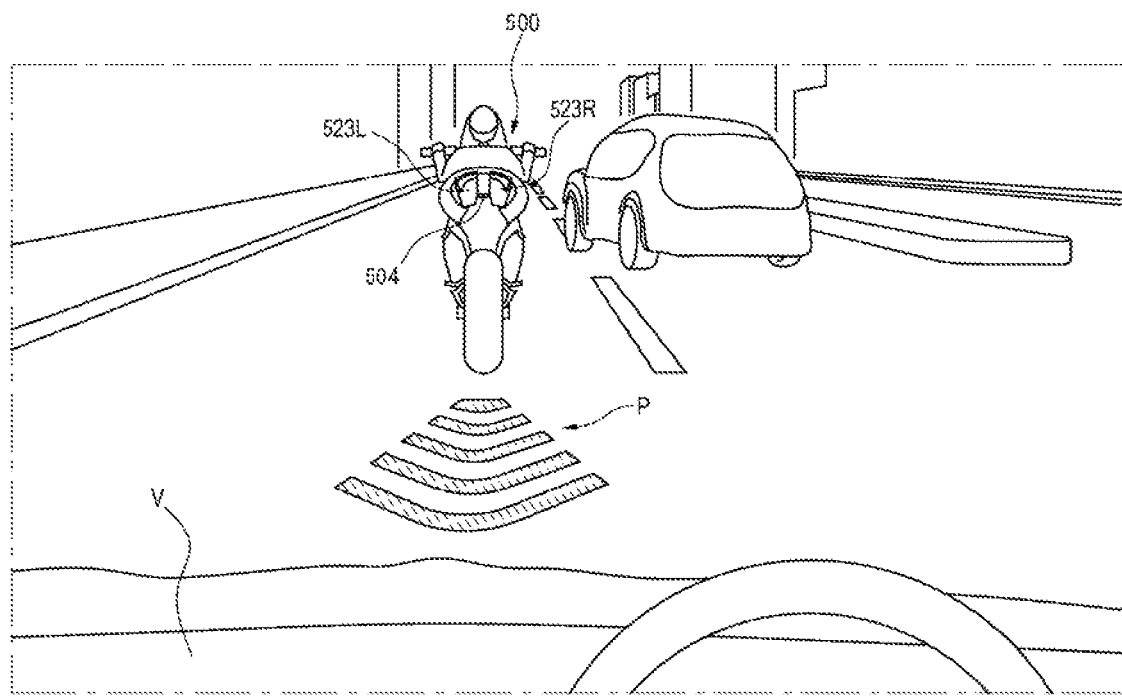
FIG. 25 is a schematic view showing an example of the lighting control of the road surface drawing lamp shown in FIG. 20.

The road surface drawing lamp 504 is disposed on a lower surface of the protrusion 603. For example, as shown in FIG. 25, the road surface drawing lamp 504 can form a fan-shaped road surface drawing pattern P by irradiating the road surface behind the motorcycle 500 with a plurality of band-shaped lines. A mounting position of the road surface drawing lamp 504 may be any position as long as the road surface drawing pattern P can be formed on the road surface behind the motorcycle 500, and is not limited to the position illustrated in the present embodiment.

The illumination control unit 505 is configured to change lighting modes of the lamps 521L, 521R, 523L, 523R, 525L, 525R of the rear combination lamp unit 502 and the road surface drawing lamp 504 depending on a state of the motorcycle 500. For example, the illumination control unit 505 may be configured to light the left stop lamp 521L, the right stop lamp 521R, the left tail and stop lamp 523L and the right tail and stop lamp 523R based on brake control of a driver of the motorcycle 500. The illumination control unit 505 may be configured to light, one of the left turn signal lamp 525L and the right turn signal lamp 525R based on a direction instruction input of the driver of the motorcycle 500. The illumination control unit 505 may be configured to form the road surface drawing pattern P on the road surface by the road surface drawing lamp 504 simultaneously with a lighting timing of the lamps of the rear combination lamp unit 502 or in conjunction with the lighting timing of the lamps of the rear combination lamp unit 502.

Figure 23:
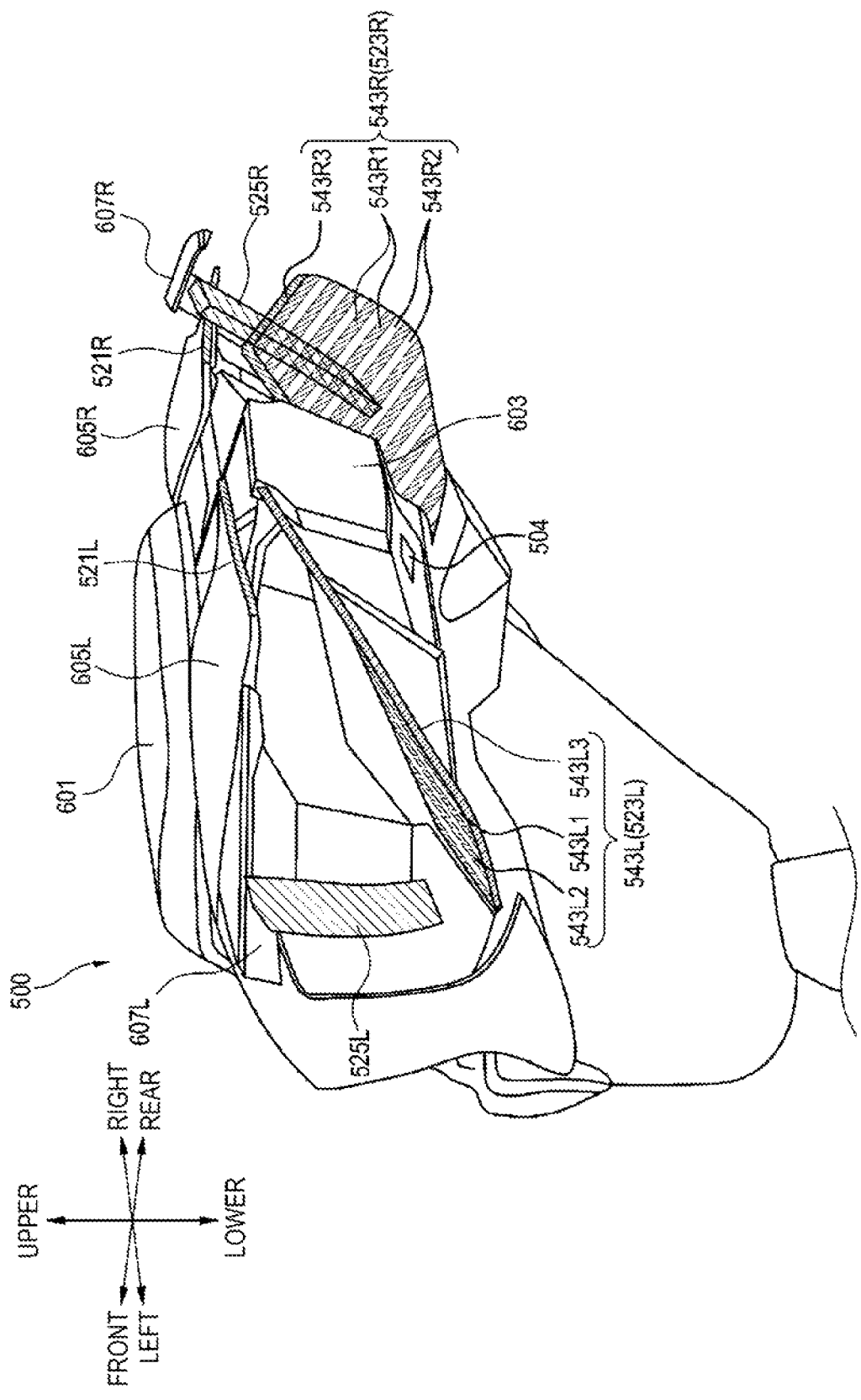
FIG. 23 is a left side perspective view of the vehicle lamp in FIG. 17.

As described above, the vehicle lamp 501 according to the present embodiment includes the left and right tail and stop lamps 523E, 523R (examples of a first lamp) that emit light to the rear side of the motorcycle 500, and left and right turn signal lamps 525L, 525R (examples of a second lamp) disposed on a side of the motorcycle 500 frontward than the left and right tail, and stop lamps 523L, 523H to emit light to the rear side of the motorcycle 500. The tail and stop lamps 523L, 523R respectively include the light sources 541 and light guides 543L, 543R that diffuse the light emitted from the light sources 541. Since the light guides 543L, 543R are formed of a transparent member, the turn signal lamps 525L, 525R are configured to be visible respectively through the light guides 543L, 543R of the tail and stop lamps 523L, 523R. According to this configuration, as shown in FIGS. 21 and 23, even from a direction in which the tail and stop lamps 523L, 523R are disposed inward than the turn signal lamps 525L, 525R, lighting of the turn signal lamps 525L, 525R can be recognized respectively via the light guides 543L, 543R. That is, visibility of the turn signal lamps 525L, 525R can be ensured from any direction behind the vehicle.

The light guides 543L, 543R of the tail and stop lamps 523L, 523R are formed in a plate shape. Therefore, the visibility of the tam signal lamps 525L, 525R can be reliably ensured. In the above example, the light guides 543L, 543R of the tail and stop lamps 523L, 523R are formed of the transparent member, but the present invention is not limited thereto. The light guides 543L, 543R may be formed of a member (for example, a translucent member) having a light-transmitting property through which the turn signal lamps 525L, 525R are visible. In the above example, an entirety of each of the light guides 543L, 543R is formed of the transparent member, but the present invention is not limited thereto. As long as the turn signal lamps 525L, 525R are visible through the light guides 543L, 543R, a part of each of the light guides 543L, 543R may be made of a non-transparent member.

The light guides 543L, 543R are configured such that the first light-emitting regions 543L1, 543R1 that diffusely radiate the light emitted from the light sources 541 and light non-emitting regions 543L2, 543R2 that do not diffusely radiate the light emitted from light sources 541 are alternately disposed to form the stripe pattern. Thereby, the tail and stop lamps 523L, 523R having novel designs while ensuring the visibility of the turn signal lamps 525L, 525R can be provided.

The light guides 543L, 543R further include the second light emitting regions 543L3, 543R3 disposed respectively on the outer edge thereof and formed of a material containing the light diffusing material. The light emission intensity of the second light emitting regions 543L3, 543R3 is higher than the light emission intensity of the first light emitting regions 543L1, 543R1. Thereby, a function of the tail and stop lamps 523L, 523R as marker lamps can be maintained by causing the second light emitting regions 543L3, 543R3 to emit the light, and the tail and stop lamps 523L, 523R having novel designs can be provided by causing the first light emitting regions 543L1, 543R1 forming the stripe pattern to emit the light.

Next, an example of lighting control processing of the road surface drawing lamp 504 according to the present embodiment will be described with reference to FIGS. 24 and 25.

First, the illumination control unit 505 receives a detection signal from the external sensor 507 (for example, the camera 507A and the LiDAR 507B disposed on a rear end surface of the protrusion 603), and acquires environmental information around the motorcycle 500 (step S10).

Next, based on the environmental information acquired in step S10, the illumination control unit 505 determines whether an inter-vehicle distance between the motorcycle 500 as an own vehicle and an object (for example, a following vehicle V in FIG. 25) is equal to or smaller than a first distance (step S12). The first distance is, for example, about 7 to 10 meters. When it is determined in step S12 that the inter-vehicle distance is equal to or smaller than the first distance (Yes in step S12), the illumination control unit 505 continuously lights the road surface drawing lamp 504 (step S14). Thereby, the fan-shaped road surface drawing pattern P including the plurality of band-shaped lines is formed by continuously irradiating the road surface behind the motorcycle 500 (see FIG. 25).

Next, the illumination control unit 505 determines whether the inter-vehicle distance between the motorcycle 500 and the following vehicle V is equal to or smaller than a second distance (step S16). The second distance is, for example, about 4 to 7 meters. When it is determined in step S16 that the inter-vehicle distance is equal to or smaller than the second distance (Yes in step S16), the illumination control unit 505 causes the road surface drawing lamp 504 to blink (step S18). Thereby, the road surface drawing pattern P is under blink irradiation.

Next, the illumination control unit 505 determines whether the inter-vehicle distance is equal to or smaller than the second distance (step S20). When it is determined in step S20 that the inter-vehicle distance is not equal to or smaller than the second distance (that is, the inter-vehicle distance is larger than the second distance) (No in step S20), the illumination control unit 505 continuously lights the road surface drawing lamp 504 (step S22). Thereby, the road surface drawing pattern P is formed again by continuous irradiation.

Next, the illumination control unit 505 determines whether the inter-vehicle distance equal to or smaller than the first distance (step S24). When it is determined in step S24 that the inter-vehicle distance is not equal to or smaller than the first distance (that is, the inter vehicle distance is larger than the first distance) (No in step S24), the illumination control unit 505 turns off the road surface drawing lamp 504 during continuous lighting (step S26). Thereby, the road surface drawing pattern P disappears. Thereafter, the illumination control unit 505 returns the processing to step S12.

As described above, the vehicle lamp 501 according to the present embodiment includes the road surface drawing lamp 504 that forms the road surface drawing pattern P on the road surface behind the motorcycle 500, the external sensor 507 (for example, the camera 507A and the LiDAR 507B) that detects the following vehicle V of the motorcycle 500, and an illumination control unit 505 that controls the road surface drawing lamp 504. The illumination control, unit 505 controls the road surface drawing lamp 504 so as to form the road surface drawing pattern P, for example, when the inter-vehicle distance between the motorcycle 500 and the following vehicle V is equal to or smaller than a certain distance (for example, the first distance), based on detection information on the following vehicle V acquired from the external sensor 507 (an example of first detection information). According to this configuration, by forming the road surface drawing pattern P on the road surface behind the motorcycle 500 when the inter-vehicle distance between the motorcycle 500 and the following vehicle V is short, a driver of the following vehicle V can be notified of approach to the motorcycle 500. Thereby, the driver of the following vehicle V can be alerted to appropriately ensure the inter-vehicle distance to the motorcycle 500.

The road surface drawing pattern formed on the road surface around the motorcycle 500 is not limited to the shape of the road surface drawing pattern P shown in FIG. 25. For example, the illumination control unit may form a road surface drawing pattern including information on the inter-vehicle distance (for example, "Get closer!" or "Inter-vehicle distance: **m"). Thereby, the driver of the following vehicle V can easily recognize that the road surface drawing pattern is intended to ensure the inter-vehicle distance.

In the above embodiment, the road surface drawing lamp 504 is disposed in the rear portion of the motorcycle 500 (in vicinity of the rear combination lamp unit 502) and the road surface drawing pattern P is formed on the road surface behind the motorcycle 500 by the light emitted from the road surface drawing lamp 504, but the present invention is not limited thereto. When a road surface drawing lamp is provided in a front portion or a side portion of the motorcycle 500 and a distance between the motorcycle 500 and an object in front of or on the side of the vehicle for example, a preceding vehicle, a parallel running vehicle, an oncoming vehicle or a pedestrian) is smaller than a certain distance, the illumination control unit may form a predetermined road surface drawing pattern on the road surface in front of or on the side of the motorcycle 500. With this configuration, the driver of the vehicle or the pedestrian around the motorcycle 500 can be notified of approach to the motorcycle 500, and the driver of the motorcycle 500 can be notified of approach to the surrounding object.

The illumination control unit 505 is configured to change a display mode of the road surface drawing pattern P depending on the inter-vehicle distance between the motorcycle 500 and the following vehicle V. Specifically, as described above, in a case where a plurality of thresholds (the first distance and the second distance) are provided for the inter-vehicle distance between the motorcycle 500 and the following vehicle V, and the inter-vehicle distance is equal to or smaller than the first distance, the illumination control unit 505 is configured to continuously irradiate the road surface to form the road surface drawing pattern P when the inter-vehicle distance is equal to or smaller than the first distance, and to cause the road surface drawing pattern P under blink irradiation when the inter vehicle distance is equal to or smaller than the second distance. Thereby, the driver of the following vehicle V can be more effectively alerted using the road surface drawing pattern P. Instead of causing the entire road surface drawing pattern P under blink irradiation, the illumination control unit 505 may emit in a stepwise manner (sequentially emit) the plurality of band-shaped lines constituting the road surface drawing pattern P. When the inter-vehicle distance is equal to or smaller than the second distance, the illumination control unit 505 may be configured to change the shape of the road surface drawing pattern to a shape different from that of the road surface drawing pattern P.

The illumination control unit 505 may be configured to be capable of acquiring detection information (an example of second detection information) different from the detection information on the following vehicle V. The second detection information preferably includes at least one of information on the vehicle speed of the motorcycle 500, information on a change state of the vehicle speed of the motorcycle 500, and information on weather. In this way, by adding other conditions other than the inter-vehicle distance between the motorcycle 500 and the following vehicle V to form the road surface drawing pattern P, the illumination control unit 505 can more effectively alert the driver of the following vehicle V. In a case where it is important to ensure the inter-vehicle distance, for example, when the motorcycle 500 is traveling at a high speed, when the motorcycle 500 performs a sudden brake, or in bad weather, it is preferable to advance an irradiation timing of the road surface drawing pattern P or to form the road surface drawing pattern P with high visibility from the driver of the following vehicle V. Therefore, by setting the first distance serving as the threshold of the inter-vehicle distance to a distance longer than normal (far example, about 10 to 13 meters) based on the second detection information, the driver of the following vehicle V can be reliably alerted even in a scene where it is important to ensure the inter-vehicle distance. Instead of changing setting of the first distance, or in addition to changing the setting, of the first distance, when the inter-vehicle distance is equal to or lower than the first distance, the road surface drawing pattern P may be under blink irradiation by causing the road surface drawing lamp 504 to blink.

The illumination control unit 505 preferably has a first mode in which the road surface drawing pattern P is formed on the road surface by lighting the road surface drawing lamp 504 depending on the first detection information, and a second mode in which the road surface drawing pattern P is formed on the road surface depending on an input instruction of the driver of the motorcycle 500. In this way, since the illumination control unit 505 has the second mode in which the road surface drawing pattern P can be formed based on the input instruction of the driver of the motorcycle 500, the road surface drawing pattern P can be appropriately formed even when it is determined that the driver is required to alert the following vehicle V.

In the above embodiment, the first detection information on the object (for example, the following vehicle V) around the vehicle is acquired by the external sensor 507 including at least one of a LiDAR, a camera, a radar and the like, but the present invention is not limited thereto. For example, the illumination control unit 505 may acquire the first detection information using road-to-vehicle communication with a base station device or inter-vehicle communication with an onboard device of another vehicle. The illumination control unit 505 may acquire the first detection information by combining the detection signal from the external sensor 507 and the mad-to-vehicle communication or the inter-vehicle communication. In this way, by using the road-to-vehicle communication or the inter-vehicle communication, various detection information can be acquired.

Figure 24:
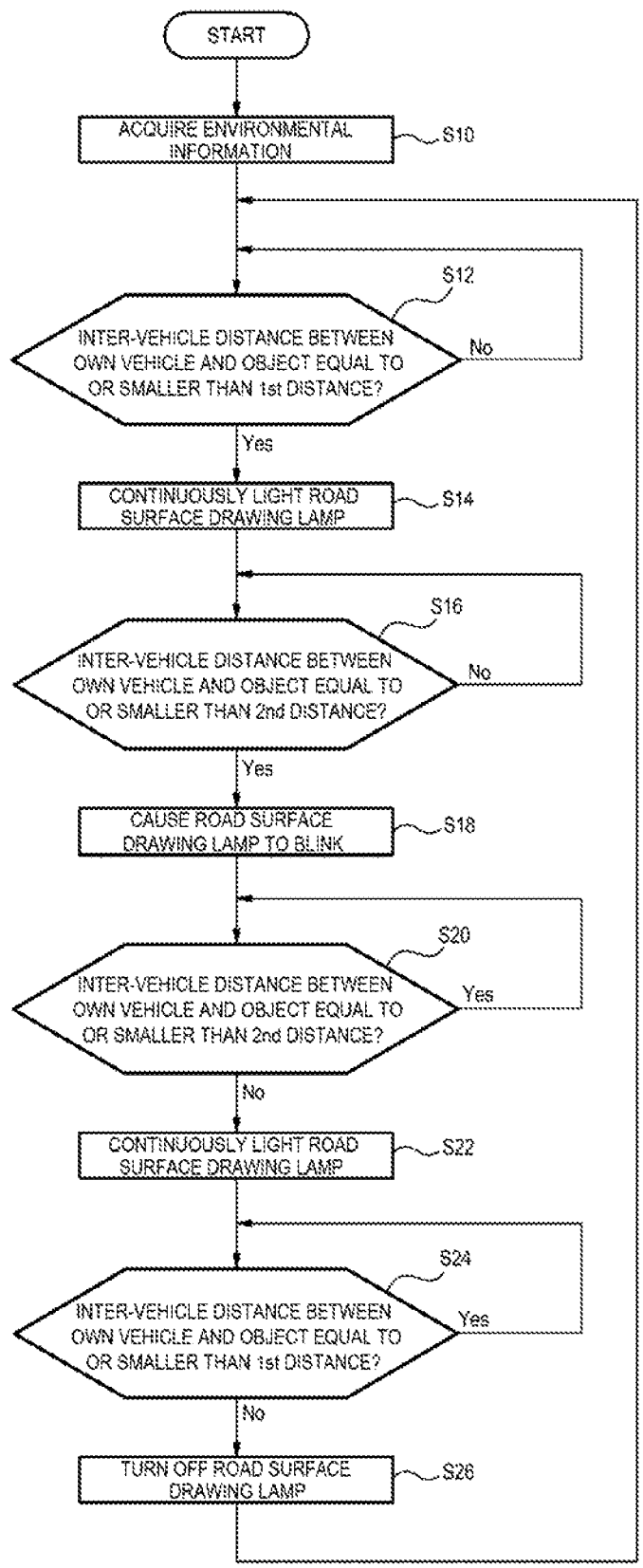
FIG. 24 is a flowchart showing an example of lighting control of the road surface drawing lamp shown in FIG. 20.

An order of the processing defined in the steps shown in FIG. 24 is merely an example, and the order of these steps can be changed as appropriate.

Although the embodiments of the present invention have been described above, it is needless to say that the technical scope of the present invention should not be interpreted as being limited to the description of the embodiments. The present embodiments are merely examples and it is to be understood by those skilled in the art that various modifications of the embodiments can be made within the scope of the invention described in the claims. The technical scope of the present invention should be determined based on the scope of the invention described in the claims and the scope of equivalents thereof.

This application is based on Japanese Patent Application No. 2017-168285 filed on Sep. 1, 2017, Japanese Patent Application No. 2017-168286 filed on Sep. 1, 2017, and Japanese Patent Application No. 2017-204725 filed on Oct. 23, 2017, the contents of which are incorporated herein by reference.

The invention claimed is:

1. A vehicle illumination system provided in a vehicle capable of traveling around a corner by inclining a vehicle body toward a turning direction, the vehicle illumination system comprising:
    a headlamp mounted on a front portion of the vehicle;
    a communication lamp disposed on the vehicle body in a region adjacent to the head lamp so as to be visible from ahead of the vehicle; and
    an illumination control unit configured to change a lighting mode of the communication lamp depending on a state of the vehicle,
    wherein the communication lamp is a decorative lamp that informs another vehicle of an existence of the vehicle.

2. The vehicle illumination system according to claim 1, wherein the illumination control unit is configured to change the lighting mode of the communication lamp depending on a lighting mode of the headlamp.

3. The vehicle illumination system according to claim 1 wherein the communication lamp includes a plurality of light emitting segments, and
    wherein the illumination control unit is configured to change a lighting mode of each of the plurality of light emitting segments.

4. The vehicle illumination system according to claim 3, wherein each of the plurality of light emitting segments includes a light source and a cover member configured to cover the light source and to transmit light from the light source, and
    wherein when the light source is not lit, the cover member is configured to be visible in a color that is the same as or similar to a color of the region in which the communication lamp of the vehicle body is disposed.

5. The vehicle illumination system according to claim 1, wherein the communication lamp emits light at a light intensity that does not give glare to a pedestrian or driver of another vehicle.

6. A vehicle illumination system provided in a vehicle capable of traveling around a corner by inclining a vehicle body toward a turning direction, the vehicle illumination system comprising:

a headlamp mounted on a front portion of the vehicle;

a communication lamp disposed on the vehicle body in a region adjacent to the head lamp so as to be visible from ahead of the vehicle;

an illumination control unit configured to change a lighting mode of the communication lamp depending on a state of the vehicle; and a road surface drawing lamp capable of forming a road surface drawing pattern on a road surface, wherein a light emission pattern of the communication lamp is associated with the road surface drawing pattern.

7. The vehicle illumination system according to claim 6, wherein a light emission timing of the light emission pattern coincides with a light emission timing of the road surface drawing pattern.

\* \* \* \* \*